US012730765B2

(12) United States Patent
Jayaraman et al.

(10) Patent No.: US 12,730,765 B2
(45) Date of Patent: Sep. 8, 2026

(54) TECHNIQUES TO SHARE MEMORY ACROSS NODES IN A SYSTEM

(71) Applicant: Altera Corporation, San Jose, CA (US)

(72) Inventors: Ramkumar Jayaraman, Bangalore (IN); Robert Blankenship, Tacoma, WA (US); Yojan Chitkara, Bangalore (IN); Rahul Pal, Bangalore (IN)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 18/127,324

(22) Filed: Mar. 28, 2023

(65) Prior Publication Data

US 2023/0236995 A1 Jul. 27, 2023

(51) Int. Cl.
*G06F 13/16* (2006.01)
*G06F 12/084* (2016.01)

(52) U.S. Cl.
CPC ........ *G06F 13/1668* (2013.01); *G06F 12/084* (2013.01); *G06F 2212/603* (2013.01)

(58) Field of Classification Search
CPC ............... G06F 13/1668; G06F 12/084; G06F 2212/603; G06F 12/0813; G06F 12/109; G06F 2212/1024; G06F 2212/2542; G06F 2212/621; G06F 2212/656; G06F 2212/657; G06F 12/0833
See application file for complete search history.

(56) References Cited

U.S. PATENT DOCUMENTS

| | | | | |
|---|---|---|---|---|
| 9,164,911 | B2 | 10/2015 | Farrell et al. | |
| 12,067,266 | B1 * | 8/2024 | Musoll | G06F 3/0625 |
| 12,235,766 | B2 * | 2/2025 | Dai | G06F 12/0246 |
| 12,423,226 | B2 * | 9/2025 | Hyatt | G06F 12/0246 |
| 2018/0011792 | A1 | 1/2018 | Koker | |
| 2021/0149600 | A1 | 5/2021 | Brewer | |
| 2021/0200545 | A1 | 7/2021 | Marolia et al. | |
| 2022/0114098 | A1 | 4/2022 | Das Sharma et al. | |
| 2024/0281275 | A1 * | 8/2024 | Muthupandi | G06F 9/45558 |

FOREIGN PATENT DOCUMENTS

EP 3588317 A1 1/2020

OTHER PUBLICATIONS

CXL (Year: 2020).*

* cited by examiner

*Primary Examiner* — Tim T Vo
(74) *Attorney, Agent, or Firm* — Nicholson De Vos Webster & Elliott LLP

(57) ABSTRACT

Techniques to shared system memory across nodes in a system. Circuitry is arranged to provide a mechanism to share a memory region of a memory maintained at a first host CPU at a first node across multiple other host CPUs at multiple other nodes using various links and protocols described in one or more revisions of the Compute Express Link (CXL) specification.

21 Claims, 13 Drawing Sheets

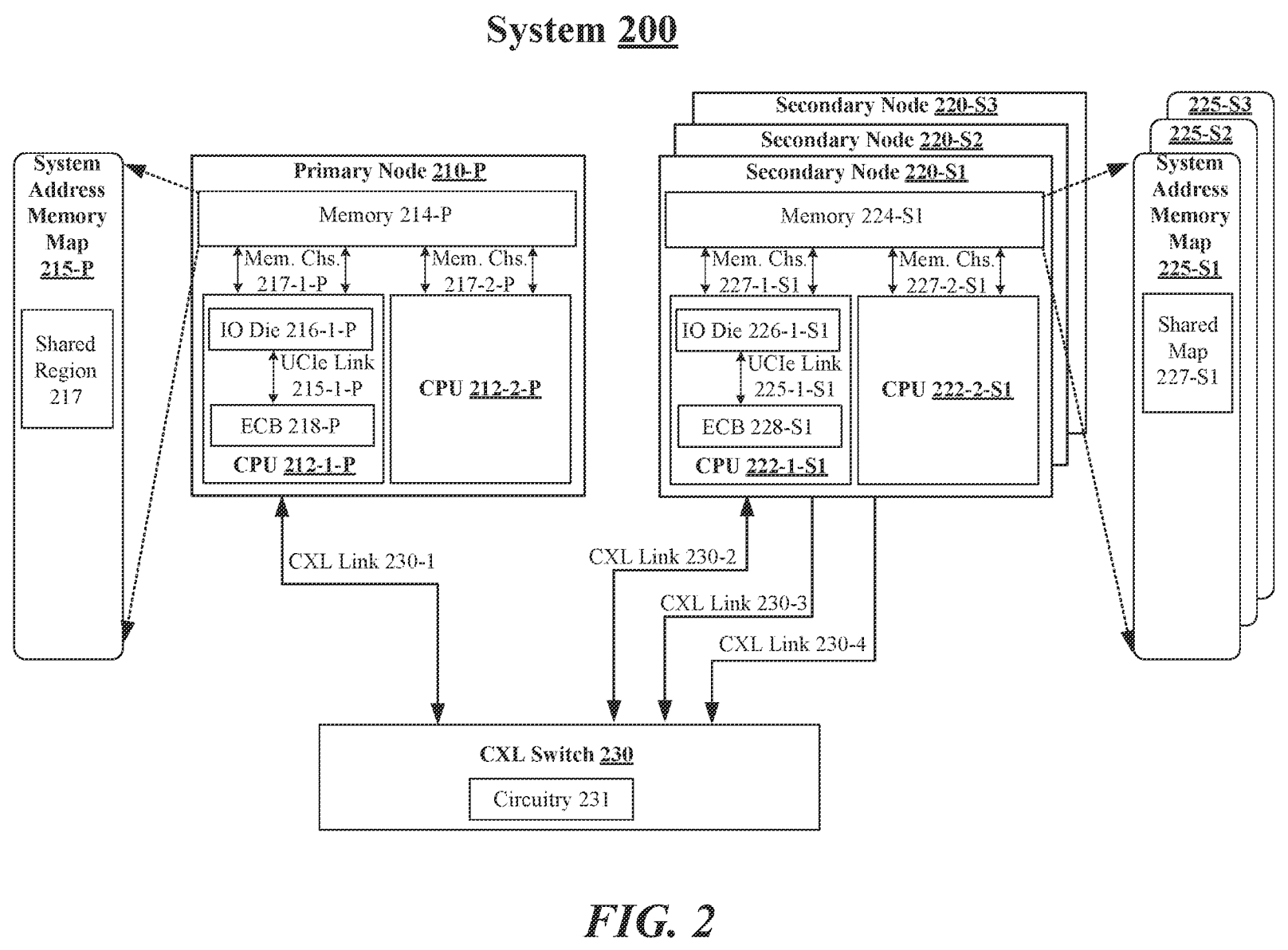

System 200

Primary Node 210-P
Memory 214-P
Mem. Chs. 217-1-P
Mem. Chs. 217-2-P
IO Die 216-1-P
UCIe Link 215-1-P
ECB 218-P
CPU 212-1-P
CPU 212-2-P System Address Memory Map 215-P
Shared Region 217

Secondary Node 220-S3
Secondary Node 220-S2
Secondary Node 220-S1
Memory 224-S1
Mem. Chs. 227-1-S1
Mem. Chs. 227-2-S1
IO Die 226-1-S1
UCIe Link 225-1-S1
ECB 228-S1
CPU 222-1-S1
CPU 222-2-S1

225-S3
225-S2
System Address Memory Map 225-S1
Shared Map 227-S1

CXL Link 230-1
CXL Link 230-2
CXL Link 230-3
CXL Link 230-4

CXL Switch 230
Circuitry 231

FIG. 2

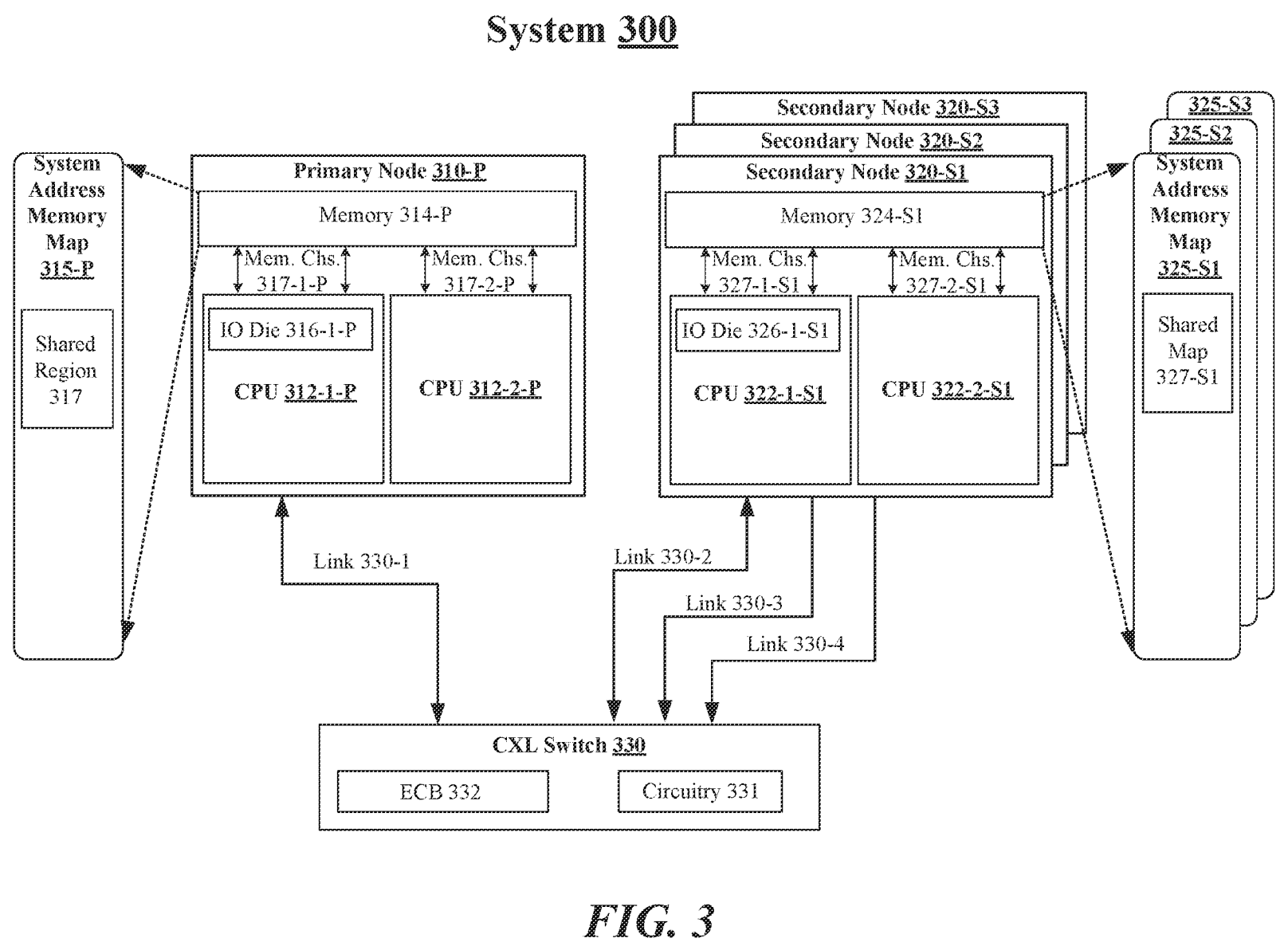

System 300

Secondary Node 320-S3
Secondary Node 320-S2
Secondary Node 320-S1
Memory 324-S1
Mem. Chs. 327-1-S1
Mem. Chs. 327-2-S1
IO Die 326-1-S1
CPU 322-1-S1
CPU 322-2-S1

325-S3
325-S2
System Address Memory Map 325-S1
Shared Map 327-S1

Primary Node 310-P
Memory 314-P
Mem. Chs. 317-1-P
Mem. Chs. 317-2-P
IO Die 316-1-P
CPU 312-1-P
CPU 312-2-P System Address Memory Map 315-P
Shared Region 317

Link 330-1
Link 330-2
Link 330-3
Link 330-4

CXL Switch 330
Circuitry 331
ECB 332

FIG. 3

Snoop Filter 400

| Incoming Link Port | Address of Cache Line | To Snoop Secondary Nodes (Bit mask i.e., Sn, ..., S3, S2, S1) |
|---|---|---|
| Port 0 | 0x2000_0040 | 3'b001 |
| Port 1 | 0x10_8000_2000 | 3'b101 |
| ... | ... | ... |
| | | |

Figure 12:
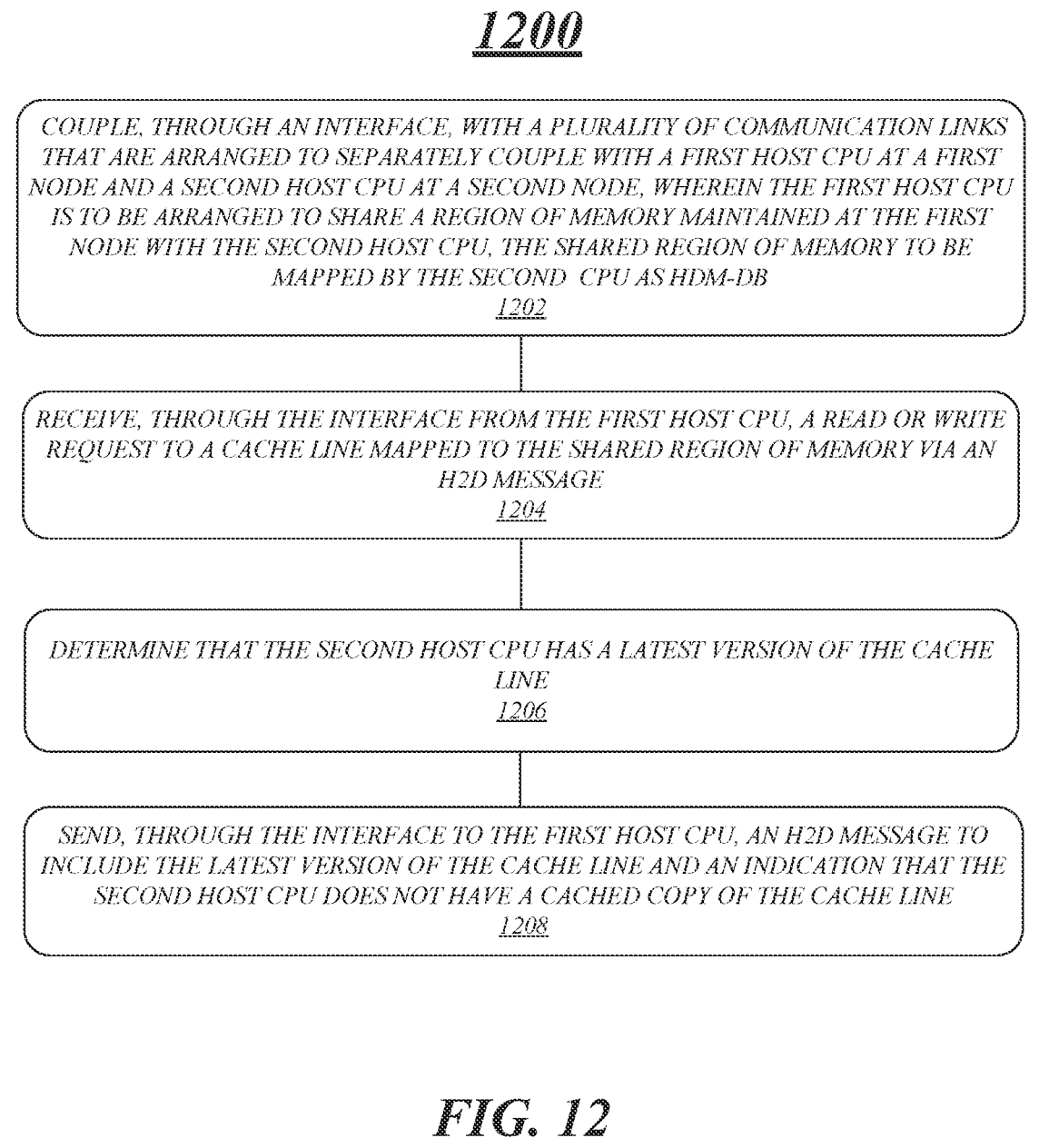

COUPLE, THROUGH AN INTERFACE, WITH A PLURALITY OF COMMUNICATION LINKS THAT ARE ARRANGED TO SEPARATELY COUPLE WITH A FIRST HOST CPU AT A FIRST NODE AND A SECOND HOST CPU AT A SECOND NODE, WHEREIN THE FIRST HOST CPU IS TO BE ARRANGED TO SHARE A REGION OF MEMORY MAINTAINED AT THE FIRST NODE WITH THE SECOND HOST CPU, THE SHARED REGION OF MEMORY TO BE MAPPED BY THE SECOND CPU AS HDM-DB
1202

RECEIVE, THROUGH THE INTERFACE FROM THE FIRST HOST CPU, A READ OR WRITE REQUEST TO A CACHE LINE MAPPED TO THE SHARED REGION OF MEMORY VIA AN H2D MESSAGE
1204

DETERMINE THAT THE SECOND HOST CPU HAS A LATEST VERSION OF THE CACHE LINE
1206

SEND, THROUGH THE INTERFACE TO THE FIRST HOST CPU, AN H2D MESSAGE TO INCLUDE THE LATEST VERSION OF THE CACHE LINE AND AN INDICATION THAT THE SECOND HOST CPU DOES NOT HAVE A CACHED COPY OF THE CACHE LINE
1208

TECHNIQUES TO SHARE MEMORY ACROSS NODES IN A SYSTEM

TECHNICAL FIELD

Examples described herein are related to pooled memory.

BACKGROUND

Data centers based on disaggregated architectures are expected to be the most common types of data centers in the future. Disaggregated architectures, for example, can keep memory disaggregated from computational units or processing nodes. Disaggregated memory, in some examples, can be coupled with computational units or processing nodes via a switching fabric. The switching fabric, for example, can be arranged to operate in accordance with one or more technical specifications such as technical specifications published by the Compute Express Link (CXL) Consortium that include CXL Specification, Rev. 2.0, Ver. 1.0, published Oct. 26, 2020, ("CXL 2.0") or CXL Specification, Rev. 3.0, Ver. 1.0, published Aug. 1, 2022, (CXL 3.0"). Communication or data links for a switching fabric configured in accordance with CXL 2.0, CXL 3.0 or subsequent CXL specifications can be referred to as "CXL links". Also, in examples where disaggregated memory and computational units can be included in system that includes interconnected dies or chiplets, the communication or data links for the switching fabric can also be configured in accordance with another technical specification such as a technical specification published by Universal Chiplet Interconnect Express™ (UCIe™) that is known as the UCIe 1.0 Specification, published Mar. 2, 2022, hereinafter referred to as "the UCIe specification". Communication or data links for a switching fabric can be configured according to the UCIe specification and use protocols described in CXL 2.0 or CXL 3.0, or subsequent CXL specifications. Communication or data links for this type of UCIe/CXL arrangement can be referred to as "CXL over UCIe links".

Complex software applications executed within a data center having a disaggregated architecture can be built based on partitioning involved computations as software processes (or threads). Software processes (or threads) can be assigned to multiple hardware core/threads across different system or processing nodes. A system or processing node can be defined as a single platform that can include multiple compute cores/threads and executes its own system or platform firmware. Hence, a system or processing node can set up a single execution environment for higher layer software. Since a number of hardware cores/threads available on a system or processing node is limited, shared memories across different system or processing nodes can become necessary to communicate intermediate results of computation for complex software applications that can aggregate computation resources across the different system or processing nodes. The shared memories and different system or processing nodes can be interconnected via a switch fabric that includes CXL links or CXL over UCIe links.

BRIEF DESCRIPTION OF THE DRAWINGS

FIG. 2 illustrates an example second system.
FIG. 3 illustrates an example third system.
FIG. 4 illustrate an example snoop filter table.
FIG. 12 illustrates an example third logic flow.
FIG. 13 illustrates an example of a storage medium.

DETAILED DESCRIPTION

Figure 1:
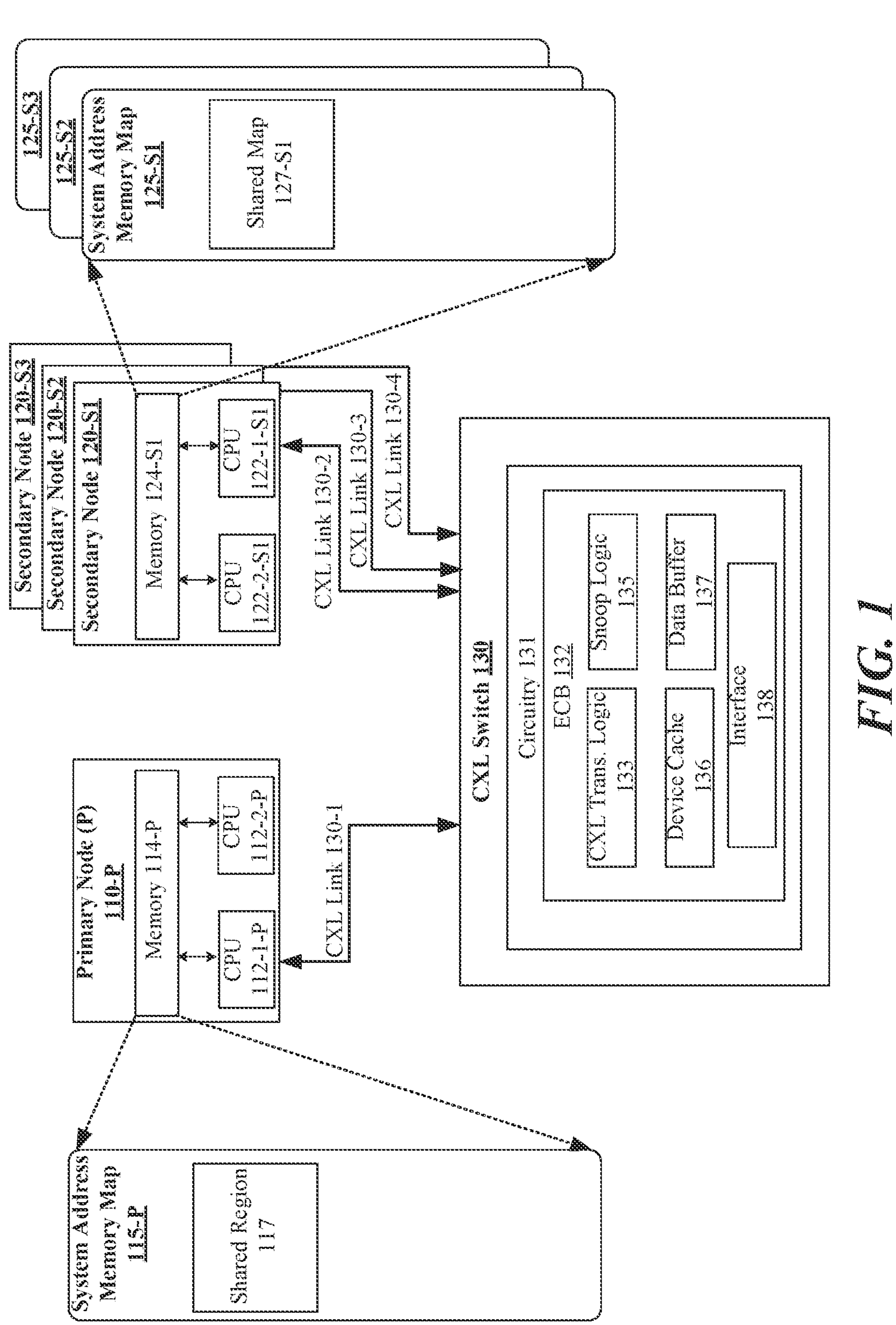
FIG. 1 illustrates an example first system.

In some example, data centers based on disaggregated architectures that provide execution environments for complex software applications can aggregate computation resources across different system or processing nodes and use shared memories to communicate intermediate results between the different system or processing nodes. The different system or processing nodes can each include cores/threads to operate on data placed in a respective system or processing node's input memory. The data placed in the respective system or processing node's input memory can then be used to generate data which is then placed in the respective system or processing node's output memory. The data placed in the respective system or processing node's output memory can then be copied across one or more system or processing nodes for further processing. This process of moving/copying data from one system or processing node to other system or processing nodes (also known as double copying) can significantly increase computation overhead and can also negatively impact system performance.

A solution to address computational overhead associated with moving/copying data from one system or processing node to other system or processing nodes includes use of remote direct memory access (RDMA) based technologies such as RDMA over Converged Ethernet (RoCE) or Internet Wide-area RDMA Protocol (iWARP). The use of RDMA or iWARP, for example, can typically include offloading data movement across system or processing nodes to smart network interface controllers (NICs) and/or infrastructure processing units (IPUs) to reduce computational overheads placed on the system or processing nodes. Although RDMA based technologies used in smart NICs or IPUs can reduce computational overhead, a coherent memory access across system or processing node memories is not provided. Typically, RDMA based technologies require that memory used by an application be pinned. Requiring the memory to be pinned is not a scalable solution. Also, the use of RDMA based technologies can require specialized hardware such as, but not limited to, smart NICs and IPUs. The use of specialized hardware can increase overall costs and add complexity to the system.

Another solution to address computational overhead associated with moving/copying data from one system or processing node to other system or processing nodes can involve use of extended node controllers (xNCs) configured to operate using Intel® Corporations Quick Path Interconnect (QPI)/Ultra Path Interconnect (UPI) protocols. A QPI/UPI based xNC architecture can allow core scaling beyond system or processing node socket limitations (e.g., limited to 2-socket or 4-socket). Although an QPI/UPI based xNC architecture can allow for platforms beyond 4-sockets and can address core limitation problems, this solution doesn't allow disparate system or processing nodes to be connected. A multi-socket platform with an xNC is still treated as a single platform/system. Also, QPI/UPI based xNC architectures can be complex and can have increased costs.

A recent solution to address computational overhead associated with moving/copying data from one system or processing node to other system or processing nodes can include shared fabric attached memory (FAM) as described in CXL 3.0. or subsequent CXL specifications. Shared FAM can allow coherent memory sharing of a host managed device memory (HDM) region of a memory device (e.g., Type 3 CXL device) that is connected behind a CXL switch. The shared FAM, for example, may allow for sharing the HDM region between multiple hosts (system or processing nodes). However, this shared FAM requires that a backed-up memory be used for HDM to be included in the memory device that is connected behind a CXL switch. This requirement to have the HDM in a memory device behind the CXL switch may not allow for the use of memory maintained at the host to communicate intermediate results between the different system or processing nodes in a disaggregated architecture when implementing a shared FAM solution. For example, dual in-line memory modules (DIMMs) maintained at a system or processing node that include double data rate (DDR) types of memory (e.g., DDR5 or DDR4) are typically not configured as Type 3 CXL devices that are located behind a CXL switch and thus may not be allowed to be used as a shared memory when implementing shared FAM according to CXL 3.0 or subsequent CXL specifications. An ability to share these example types of memory maintained at a host across multiple system or processing nodes can allow for substantial cost reductions and may reduce operational complexity.

As described in more detail below, logic and/or features for an enhanced CXL bridge (ECB) can be arranged to provide a mechanism to share a memory region of a memory maintain at a primary system or processing node, herein referred to as a "primary node" across a system that includes one or more secondary system or processing nodes, herein referred to as "secondary nodes". An ECB can be arranged to operate in cooperation with primary and secondary nodes to enable the sharing of the memory region using various CXL links and protocols without use of a shared FAM device.

FIG. 1 illustrates an example system 100. In some examples, as shown in FIG. 1, system 100 includes a primary node 110-P, a secondary node 120-S1, a secondary node 120-S2, and a secondary node 120-S3 that are separately coupled with a CXL switch 130 via respective CXL links 130-1, 130-2, 130-3 and 130-4. For these examples, primary node 110-P and secondary nodes 120-S1, S2, S3 can each be configured as a single platform that includes multiple compute cores/threads arranged to execute their own system or platform firmware and provide a single execution environment for higher layer software. For example, multiple compute cores may be included in central processing units (CPUs) 112-1-P and 112-2-P at primary node 110-P or at CPUs 122-1-S1, S2, S3 and 122-2-S1, S2, S3 at secondary nodes 120-S1, S2, S3. These multiple compute cores may be arranged to execute threads and support respective single execution environments for these primary and secondary nodes. Examples are not limited to primary or secondary nodes having 2 CPUs and are not limited to a system having 3 secondary nodes. Any number of CPUs at a primary or secondary node are contemplated. Also, at least 1 to any number greater than 1 of secondary nodes are contemplated.

According to some examples, CXL links 130-1 to 130-4 between primary node 110-P and secondary nodes 120-S1, S2, S3 and CXL switch 130 can be configured according to CXL 2.0, CXL 3.0 and/or subsequent CXL specifications. Additionally, as shown in FIG. 1, CXL switch 130 is shown as including circuitry 131. Circuitry 131, for example, can be a field programmable gate array (FPGA), application specific integrated circuit (ASIC) or general purpose processor (CPU) that is separate from circuitry included in CXL switch 130 (not shown). That CXL circuitry can be arranged to facilitate communication over CXL links 130-1 to 130-4. In other examples, circuitry 131 can be part of the CXL circuitry that facilitates communication over CXL links 130-1 to 130-4 and thus can be at least a portion of an FPGA, an ASIC or a CPU included in CXL switch 130.

In some examples, circuitry 131 can be configured to support an extended CXL bridge (ECB) 132. As shown in FIG. 1, in some examples, ECB 132 can include logic and/or features such as a CXL translation logic 133, snoop logic 135, a device cache 136, one or more data buffer(s) 137 or an interface 138.

According to some examples, as shown in FIG. 1, primary node 110-P includes a memory 114-P. For these examples, a system address memory map 115-P can represent a map of host physical addresses (HPAs) of memory 114-P. Primary node 110-P, in some examples, can earmark a region of memory 114-P from system address memory map 115-P and include that earmarked region in shared region 117. In some examples, shared region 117 can be shared with secondary nodes 120-S1, S2, S3 and mapped by these secondary systems in their respective system address memory maps 125-S1, S2, S3. System address memory maps 125-S1, S2, S3 can separately represent a map of HPAs of a respective memory 124-S1, S2, S3. Mapped shared memory for secondary node 120-S1, for example, is shown in FIG. 1 as shared map 127-S1. Shared maps 127-S1, S2, S3 can be mapped to regions of respective memories 124-S1, S2, S3 as a CXL.mem based HDM device coherent (HDM-D) as described by CXL 2.0 and/or CXL 3.0 or as a CXL.mem based HDM device coherent using back-invalidation (HDM-DB) as described by CXL 3.0 or subsequent CXL specifications. As described more below, logic and/or features of an ECB such as CXL translation logic 133 of ECB 132 can be arranged to use back invalidate flows to resolve coherency for shared maps 127-S1, S2, S3 of secondary nodes 120-S1, S2, S3 mapped using CXL.mem based HDM-DB. If shared maps 127-S1, S2, S3 are mapped using CXL.mem based HDM-D, shared maps 127-S1, S2, S3 can map to a non-cacheable region to avoid bias-flip.

According to some examples, for CXL.mem based HDM-DB mapped shared memory, logic and/or features of an ECB such as CX: translation logic 133 of ECB 132 can convert incoming master to subordinate (M2S) request messages received from secondary nodes 120-S1, S2 or S3 to device to host (D2H) request messages (e.g., RdShared/RdOwn requests) to be relayed to primary node 110-P. The logic and/or features of ECB 132 such as CXL translation logic 133 can complete an M2S/D2H transaction by returning/writing the latest data after resolution of coherency. CXL translation logic 133 can also convert host to device (H2D) snoops from primary node 110-P to back-invalidate snoops on secondary nodes 120-S1, S2 or S3 and completes an H2D transaction by returning the latest version of the requested data from secondary nodes 120-S1, S2, or S3. In some examples, CXL translation logic 133 in cooperation with snoop logic 135 can perform offset adjustments as transactions/messages flow between primary node 110-P and secondary nodes 120-S1, S2, or S3 and/or as transactions/messages flow between secondary nodes 120-S1, S2, or S3.

In some examples, as mentioned above, ECB 132 includes a device cache 136. For these examples, device cache 136 can be used by circuitry 131 and/or CXL translation logic 133 to improve performance. Performance can be improved, for example, when caching is disabled to work around deadlock limitations associated with CXL 2.0 and mapping a shared region using CXL.mem based HDM-D.

According to some examples, as mentioned above ECB 132 includes data buffer(s) 137. For these examples, circuitry 131 and/or CXL translation logic 133 may use data buffer(s) 137 to hold one or more cache lines as they are transferred from secondary nodes 120-S1, S2, S3 to primary node 110-P or vice-versa. Usage models of data buffer(s) 137 can include writeback and evict flows from secondary nodes 120-S1, S2, or S3 to primary node 110-P.

In some examples, as mentioned above, ECB 132 includes an interface 138. For these examples interface 138 can couple with CXL links 130-1 to 130-4 to receive or send messages associated with accessing cache lines maintained in shared regions of memory mapped using CXL.mem based HDM-D or HDM-DB. For example, messages associated with receiving M2S/S2M messages or H2D/D2H messages using CXL.mem and/or CXL.cache protocols described in CXL 2.0 CXL 3.0 and/or subsequent CXL specifications.

According to some examples, ECB 132's configuration (e.g., set-up via CXL switch 130's configuration), can be used to create multiple segments with a single primary system/node and multiple secondary systems/nodes. For these examples, a fabric manager of CXL switch 130 (not shown in FIG. 1) can configure ECB 132 within CXL switch 130. This configuration of ECB 132 can hold information on CXL link ports coupled with CXL switch 130 and their associated memory ranges as configured by respective primary or secondary nodes. According to some examples, primary node 110-P's system firmware configures base addresses of different HDM-DB/HDM-D regions as part of a boot process. HDM base addresses can then be communicated to ECB 132 and maintained/stored at ECB 132 (e.g., in a snoop filter table) for performing offset adjustments as CXL transactions move across primary node 110-P and secondary nodes 120-S1, S2, S3.

FIG. 2 illustrates an example system 200. In some examples, as shown in FIG. 2, system 200 includes a primary node 210-P, secondary nodes 220-S1, S2, S3 that are separately coupled with a CXL switch 230 via respective CXL links 230-1, 230-2, 230-3 and 230-4. Also as shown in FIG. 2. CXL switch 230 includes circuitry 231, Circuitry 231 can support/execute logic and/or features for fabric switching via CXL links 230-1 to 230-4 and can include processing circuitry such a CPU, ASIC or FPGA. Similar to system 100, primary node 210-P and secondary nodes 220-S1, S2, S3 of system 200 can be separately configured as single platforms.

According to some examples, a difference between system 100 and system 200 can be that CPUs included in primary node 210-P and secondary nodes 220-S1, S2, S3 are arranged to include multiple dielets or chiplets. For these examples, use of CXL 2.0, CXL 3.0 or subsequent CXL specification protocols in an ECB can allow a seamless migration of the ECB to a dielet or chiplet inside a CPU package. A portion of these dielets or chiplets are shown in FIG. 2. An input output (IO) die 216-1-P can be a first die of multiple dielets included in CPU 212-1-P that couples with a memory 214-P via one or more memory channels 217-1-P. Also, as shown in FIG. 2, an ECB 218-P, rather than being located at CXL switch 330, can be a second die of the multiple dielets included in CPU 212-1-P. For these examples, IO die 216-1-P can couple with ECB 218-P via an UCIe link 215-P-1. CPUs 222-1-S1, S2, S3 may also include multiple dielets and include ECBs 228-S1, S2, S3 to couple with respective IO dies 226-1-S1, S2, S3 via UCIe links 225-1-S1, S2, S3. IO dies 226-1-S1, S2, S3 may also couple with respective memories 224-S1, S2, S3 via one or more memory channels 227-1-S1, S2, S3. Although not shown in FIG. 2, CPU 212-1-P or CPU 222-1-S1, S2, S3 may include one more compute dies that have a plurality of processing cores. These compute dies can be coupled with other dielets via separate UCIe links (not shown). CPU 212-2-P or CPUs 222-2-S1, S2, S3 can also include multiple dielets (not shown).

In some examples, as shown in FIG. 2, a system address memory map 215-P can represent a map of host physical addresses of memory 214-P. Primary node 210-P, in some examples, can earmark a region of memory 214-P from system address memory map 215-P and include that earmarked region in shared region 217. In some examples, shared region 217 can be shared with secondary nodes 220-S1, S2, S3 and mapped by these secondary systems in their respective system address memory maps 225-S1, S2, S3. The mapped shared memory for secondary node 220-S1, for example, is shown in FIG. 2 as shared map 221-S1. Shared maps 221-S1, S2, S3 can be mapped to regions of respective memories 224-S1, S2, S3 as a CXL.mem based HDM-D as described by CXL 2.0, CXL 3.0 and/or subsequent CXL specifications, or as a CXL.mem based HDM-DB as described by CXL 3.0 and/or subsequent CXL specifications. As described more below, logic and/or features of an ECB can be arranged to use back invalidate flows to resolve coherency for shared maps that were mapped using CXL.mem based HDM-DB. If the shared maps were mapped using CXL.mem based HDM-D, these shared maps can map to a non-cacheable region to avoid bias-flip.

Although not shown in FIG. 2, ECBs 218-P and 228-S1, S2, S3 can include circuitry to support/execute logic and/or features such as a CXL translation logic, a snoop logic, a device cache or one or more data buffer as mentioned above and shown in FIG. 1 for ECB 132. Also, ECBs 218-P and 228-S1, S2, S3 can each include an interface (also not shown) to separately couple with CXL links to receive or send messages associated with accessing cache lines maintained in shared regions of memory mapped using CXL.mem based HDM-D or HDM-DB. The interface included in ECBs 218-P and 228-S1, S2, S3 can also be arranged to couple with UCIe links in order exchange messages with other agents of a dielet or chiplet system at a CPU to also receive or send messages associated with accessing cache lines maintained in shared regions of memory mapped using CXL.mem based HDM-D or HDM-DB.

FIG. 3 illustrates an example system 300. In some examples, as shown in FIG. 3, system 300 includes a primary node 210-P, secondary nodes 220-S1, S2, S3 that are separately coupled with a CXL switch 330 via respective links 330-1, 330-2, 330-3 and 330-4. Also as shown in FIG. 3. CXL switch 330 includes circuitry 331, Circuitry 331 can support/execute logic and/or features for fabric switching via links 330-1 to 330-4 and can include processing circuitry such a CPU, ASIC or FPGA. Similar to systems 100 and 200, primary node 310-P and secondary nodes 320-S1, S2, S3 can be separately configured as single platforms. For these examples, CPUs included in primary node 310-P or secondary nodes 320-S1, S2, S3 can be arranged to include multiple dielets or chiplets as mentioned above for system 200. Although only IO dies 316-1-P and 326-1-S1 are shown in FIG. 3 for the CPUs included in primary node 310-P and secondary node 320-S1, these CPUs may also include compute dielets having a plurality of processing cores.

According to some examples, CXL switch 330 can be arranged to include multiple dielets or chiplets and as shown in FIG. 3, in some examples, ECB 332 may be one of multiple dielets included in CXL switch 330 and circuitry 331 may be resident on another one of the multiple dielets. For these examples, since dielets are at CXL switch 330 that include an ECB 332, these dielets can be arranged to communicate with dielets at primary node 210-P or secondary nodes 220-S1, S2, S3 via links 330-1, 330-2, 330-3 or 330-4. In some examples, links 330-1 to 330-4 can be configured to operate according to CXL 2.0, CXL 3.0 and/or subsequent CXL specifications (e.g., CXL links). In other examples, in order to further facilitate dielet or chiplet communications (e.g., ECB 332 to IO die 316-1-P or IO die 326-1-S1), links 330-1 to 330-4 can be configured to operate according to the UCIe specification and use protocols described in CXL 2.0, CXL 3.0 and/or subsequent CXL specifications (e.g., CXL over UCIe links).

In some examples, as shown in FIG. 3, a system address memory map 315-P can represent a map of host physical addresses of memory 314-P. Primary node 310-P, in some examples, can earmark a region of memory 314-P from system address memory map 315-P and include that earmarked region in shared region 317. In some examples, shared region 317 can be shared with secondary nodes 320-S1, S2, S3 and mapped by these secondary systems in their respective system address memory maps 325-S1, S2, S3. The mapped shared memory for secondary node 320-S1, for example, is shown in FIG. 3 as shared map 321-S1. Shared maps 321-S1, S2, S3 can be mapped to regions of respective memories 324-S1, S2, S3 as a CXL.mem based HDM-D as described by CXL 2.0, CXL 3.0 and/or subsequent CXL specifications, or as a CXL.mem based HDM-DB as described by CXL 3.0, and/or subsequent CXL specifications. As described below, logic and/or features of an ECB can be arranged to use back invalidate flows to resolve coherency for shared maps that were mapped using CXL.mem based HDM-DB. If the shared maps were mapped using CXL.mem based HDM-D, these shared maps can map to a non-cacheable region to avoid bias-flip.

Although not shown in FIG. 3, ECB 332 can include circuitry to support/execute logic and/or features such as a CXL translation logic, a snoop logic, a device cache or one or more data buffer as mentioned above and shown in FIG. 1 for ECB 132. ECB 332 can also include an interface (also not shown) to separately couple with links to receive or send messages associated with accessing cache lines maintained in shared regions of memory mapped using CXL.mem based HDM-D or HDM-DB. The interface can also be arranged to couple with UCIe links in order to exchange messages with other agents of a dielet or chiplet system at a primary or secondary node CPU to also receive or send messages associated with accessing cache lines maintained in shared regions of memory mapped using CXL.mem based HDM-D or HDM-DB.

In some examples, CPUs included in primary nodes 110/210/310-P or secondary nodes 120/220/320-S1, S2, S3 can include a plurality of processing cores, associated caches or agents (not shown in FIGS. 1-3). The processing cores can be included in one or more commercially available processors, including without limitation an AMD® Zen® processor; an ARM® processor; a Qualcomm® Snapdragon® processor; an Intel® Atom®, Core i3, Core i5, Core i7, Core i9, Xeon® or Xeon Phi® processor; SiFive® RISC-V processors; or similar processors. The cores included in these CPUs may be heterogeneous cores. For example, one of the cores included in compute dies(s) 106 can be a large processing engine designated to run foreground and/or high-performance applications. Another of the cores included in these CPUs can be a small computing engine designated to run low priority background processes. Additionally, another core included in these CPUs can be on a low power domain and can be configured to process low priority background processes.

According to some examples, memory 114/214/314-P and memory 124/224/234-S1, S2, S3 may include any combination of volatile or non-volatile memory. For these examples, the volatile and/or non-volatile memory included in memory 114/214/314-P and memory 124/224/234-S1, S2, S3 can be arranged to operate in compliance with one or more of a number of memory technologies described in various standards or specifications, such as DDR3 (DDR version 3), JESD79-3F, published by JEDEC (Joint Electronic Device Engineering Council) in July 2012, DDR4 (DDR version 4), JESD79-4C, published in January 2020, DDR5 (DDR version 5), JESD79-5B, published in September 2022, LPDDR3 (Low Power DDR version 3), JESD209-3C, published in August 2015, LPDDR4 (LPDDR version 4), JESD209-4D, published by in June 2021, LPDDR5 (LPDDR version 5), JESD209-5B, published by in June 2021), WIO2 (Wide Input/output version 2), JESD229-2, published in August 2014, HBM (High Bandwidth Memory), JESD235, published in October 2013, HBM2 (HBM version 2), JESD235C, published in January 2020, or HBM3 (HBM version 3), JESD238A, published in January 2023, or others or combinations of memory technologies, and technologies based on derivatives or extensions of such specifications. The JEDEC standards or specifications are available at www.jedec.org.

Volatile types of memory may include, but are not limited to, random-access memory (RAM), Dynamic RAM (DRAM), DDR synchronous dynamic RAM (DDR SDRAM), GDDR, HBM, static random-access memory (SRAM), thyristor RAM (T-RAM) or zero-capacitor RAM (Z-RAM). Non-volatile types of memory may include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

FIG. 4 illustrates an example snoop filter table 400. In some examples, snoop filter table 400 may reside in an ECB executed by circuitry located at a CXL switch (e.g., CXL switch 130) or an ECB included on a chiplet or a dielet (e.g., ECB 218-P, 228-S1, S2, S3 or ECB 332). For these examples, logic and/or features of the ECB such as snoop logic 135 can use snoop filter table 400 to restrict snooping activities across a primary node and multiple secondary nodes. Snoop filter table 400 can allow for limiting the snoop across primary and secondary nodes to ensure enhanced performance. Snoop filter table 400, for example, can be limited by size as per implementations that can be based on, for example, on-die structure of an ECB that has area/power constraints that could require that only $1/10^{th}$ of the on-die structure is available to support on-die memory capacity for snoop filter table 400.

According to some examples, logic and/or features of the ECB such as snoop logic 135 can use snoop filter table 400 based on cache line addresses that are dependent on a system node domain that can be decided by an incoming link port (e.g., coupled with a CXL or CXL or UCIe link) of a CXL transaction. For these examples, in case of a miss for a cache line address associated with a CXL transaction due to capacity limitations placed on snoop filter table 400, logic and/or features of the ECB such as snoop logic 135 can cause the ECB to snoop all secondary nodes before operating on a primary node.

Figure 5:
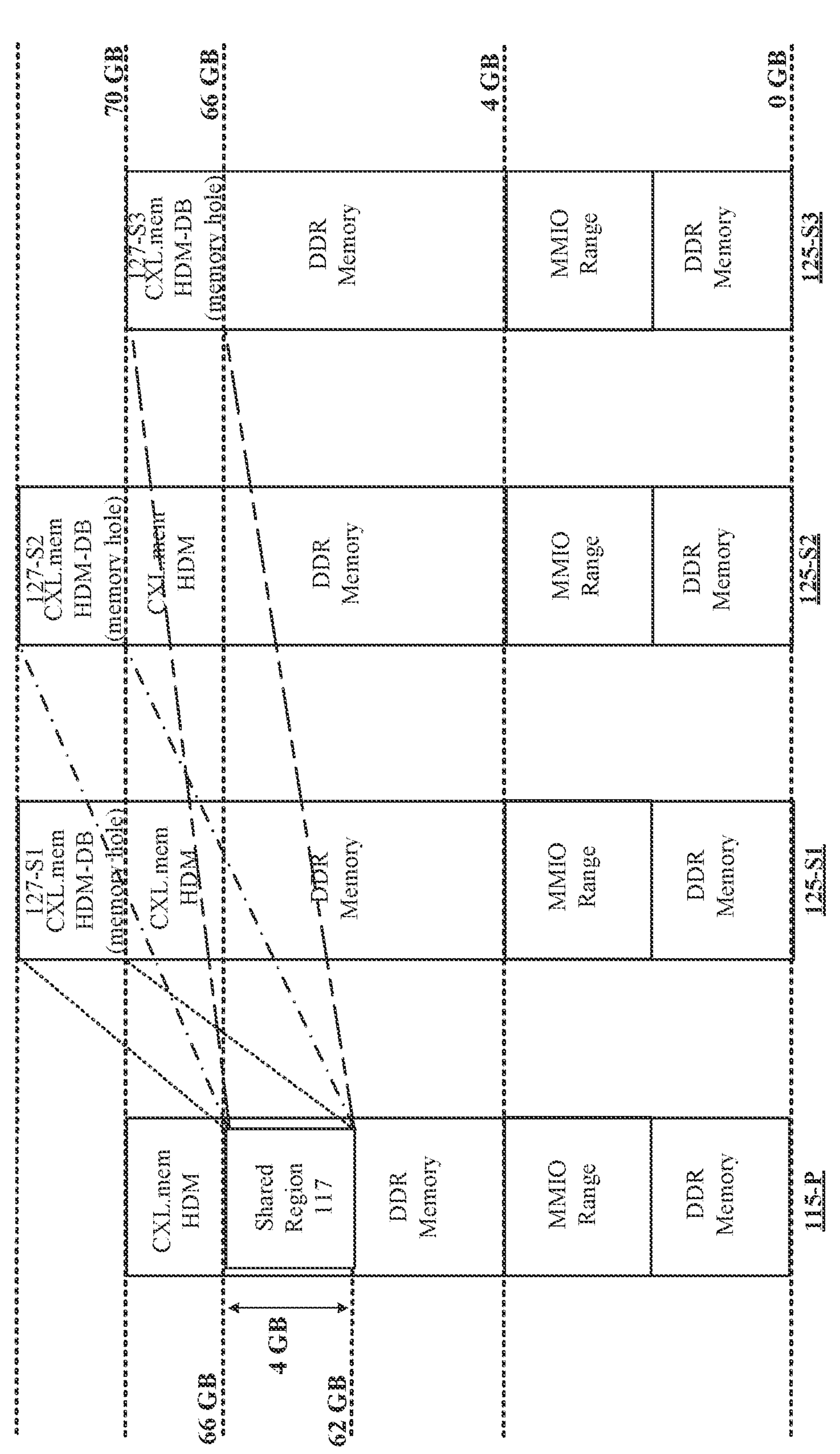
FIG. 5 illustrates an example system address maps.

FIG. 5 illustrates example system address maps 500. In some examples, system address maps 500 provides an example illustration of how shared region 117 of system address memory map 115-P for primary node 110-P memory 114-P can be mapped to system address memory maps 125, S1, S2, S3 of respective secondary nodes 120-S1, S2, S3 as mentioned above and shown in FIG. 1. For these examples, primary node 110-P earmarks 4 gigabytes (GB) of DDR memory (62 GB to 66 GB) from system address memory map 115-P and includes this earmarked DDR memory in shared region 117. Shared region 117 can then be mapped in system address memory maps 125-S1, S2, S3 of secondary nodes 120-S1, S2, S3, for example, by a memory hole covered by a CXL.mem related HDM-DB source address decoder (SAD) entry. Secondary nodes 120-S1 and 120-S2, for example, can allow access to this region of memory (127-S1, 127-S2) by providing an address ranged between 70 GB to 74 GB while secondary node 120-S3 can allow access to this region (127-S3) between 66 GB and 70 GB. Earmarked shared memory from primary node 110-P (4 GB between 62 GB and 66 GB) can be read or written by secondary nodes 120-S1 or 120-S2 using the 70 GB to 74 GB address range. This can allow multiple software threads to be spawned across primary node 110-P and secondary nodes 120-S1, S2, S3 with the shared memory region to pass-over data from producer threads to consumer threads without a need for double copying. Also, coherency semantics provided by, for example, CXL 3.0 can be leveraged to manage and resolve coherency aspects (described more below).

According to some examples, from the perspective of secondary nodes 120-S1, S2, S3, the earmarked memory included in shared region 117 appears as a global-fabric-attached memory (G-FAM), or a multi-logical device (MLD) fabric-attached memory (MLD-FAM) based memory even though primary node 110-P and second nodes 120-S1, S2, S3 are not shown as coupling with actual G-GAM/MLD-FAM based memory. This appearance as a G-FAM or MLD-FAM can allow for re-use of software components designed for use with G-FAM or MLD-FAM for shared memory.

Figure 6:
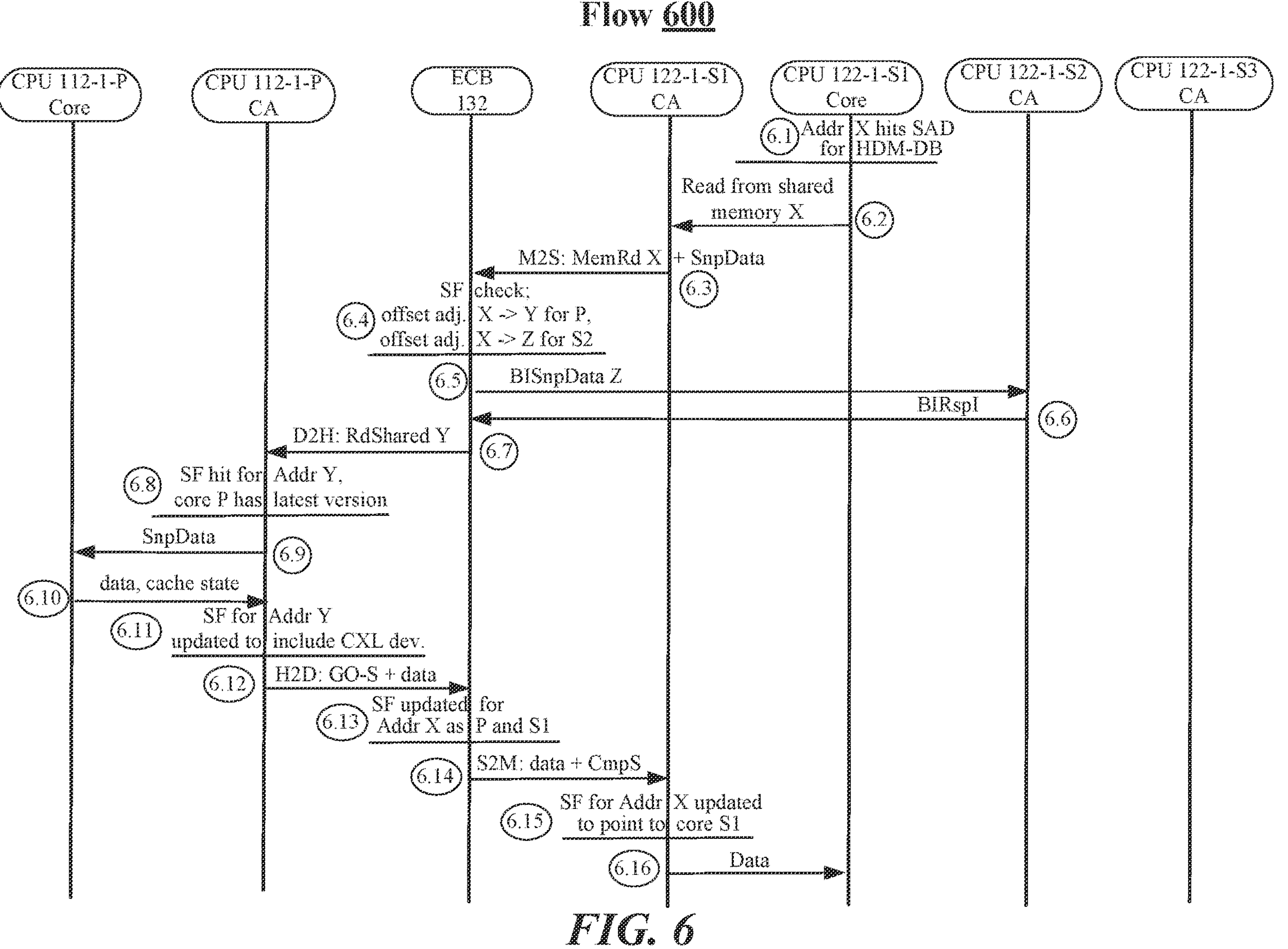
FIG. 6 illustrates an example first flow.

FIG. 6 illustrates an example flow 600. According to some examples, flow 600 shows an example of a core at CPU 122-1-S1 of secondary node 120-S1 reading a shared memory region such as shared region 117 mapped to memory 114-P at primary node 110-P. For these examples, logic and/or features of ECB 132 translates or converts M2S/D2H, S2M/H2D requests/messages and H2D snoops generated by primary node 110-P or secondary nodes 120-S1, S2, S3 according to CXL 2.0 and/or CXL 3.0 protocols. Flow 600 is not limited to the elements of system 100 shown in FIG. 6. For example, logic and/or features of ECB 132 such as CXL translation logic 133, snoop logic 135, device cache 136 or data buffer 137 can facilitate one or more aspects of translation/conversions of M2S/D2H requests or H2D snoops. Also, CXL links 130-1 to 130-4 can be used to exchange requests/messages.

Beginning at 6.1 (Addr X hits SAD for HDM-DB), a core at CPU 122-1-S1 of secondary node 120-S1 is to read a shared memory region of primary node 110-P's memory 114-P that has been mapped to system address memory map 127-S1 by a memory hole covered by a CXL.mem related HDM-DB SAD entry according to CXL 3 or subsequent CXL specifications. In some examples, address (Addr) X can represent the shared memory region to be read by the core at CPU 122-1-S1.

Moving to 6.2 (Read from shared memory X), the core at CPU 122-1-S1 sends a read request to coherency agent (CA) of CPU 122-1-S1 to read from shared memory with Addr X. According to some examples, the CA of CPU 122-1-S1 may receive requests to read from shared memory in order to maintain coherency of the shared memory that is shared with primary node 110-P and the other secondary nodes 120-S2 and 120-S3.

Moving to 6.3 (M2S: MemRd X+SnpData), the CA of CPU 122-1-S1 generates an M2S memory read (MemRd) to Addr X with a snoop data (SnpData) message. In some examples, according to CXL 3.0 or subsequent CXL specifications, SnpData indicates a snoop request from secondary node 120-S1 for a cache line that is intended to be cached in either a shared or exclusive state at the requestor.

Moving to 6.4 (SF check; offset adj X→Y for P, offset adj X→Z for S2), logic and/or features of ECB 132 such as snoop logic 135 can check a snoop filter (SF) table (e.g., snoop filter table 400) to determine which nodes may have the cache line associated with the mapped shared region corresponding to Addr X. According to some examples, snoop logic 135 arrives at a result that indicates an SF hit for Addr X at primary node 110-P that has an offset adjustment to Addr X to arrive at Addr Y and also an SF hit for Addr X at secondary node 120-S2 that has an offset adjustment to Addr X to arrive at Addr Z.

Moving to 6.5 (BISnpData Z), logic and/or features of ECB 132 such as snoop logic 135 can cause a BISnpData message for Addr Z to be sent to a CA of CPU 122-1-S2 at secondary node 120-S2 to indicate that the requester (in this case the core at CPU 122-1-S1) needs an indication of the current value or state of the cache line at Addr Z.

Moving to 6.6 (BIRSpI), responsive to the BISnpData message for Addr Z, the CA of CPU 122-1-S2, according to one example, returns a BIRspI to indicate that the current value or state of the cache line is "I". According to CXL 3.0 or subsequent CXL specifications, a current value or state of "I" can indicate that the cache line at Addr Z is invalid. In other words, a cacheable copy of the cache line is not present at Addr Z of secondary node 120-S2's shared map.

Moving to 6.7 (D2H: RdShared Y), logic and/or features of ECB 132 such as CXL translation logic 133 generates a D2H RdShared Y message and sends this message to a CA for CPU 112-1-P of primary node 110-P to request a cache line cached at Addr Y of shared region 117. In some examples, CXL translation logic 133 converts or translates the M2S: MemRd X+SnpData request received at 6.3 to the D2H RdShared Y message to make it appear to the CA for CPU 112-1-P that the request is being placed by a CXL device rather than being placed by a core of a host CPU, which is why the message sent at 6.3 by the CA of CPU 122-1-S1 was sent as an M2S message.

Moving to 6.8 (SF hit for Addr Y, core P has latest version), responsive to the D2H: RdShared Y message, the CA of CPU 112-1-P determines that its own, separately maintained SF table indicates (e.g., SF hit) the core at CPU 112-1-P has the latest version of the cache line at Addr Y.

Moving to 6.9 (SnpData), the CA of CPU 112-1-P sends a SnpData message to the core at CPU 112-1-P to indicate a request for the data in the cache line and a state of the cache line.

Moving to 6.10 (data, cache state), the core at CPU 112-1-P returns the data and a state of the cache line to the CA of CPU 112-1-P. According to some examples, the cache state is indicated as shared to indicate that the core at CPU 112-1-P has at most a shared copy of the cache line.

Moving to 6.11 (SF hit for Addr Y, updated to include CXL device), the CA of CPU 112-1-P that it has a cache line hit for its own, separately maintained SF table for Addr Y and updates that table to include a CXL device. According to some examples, the CXL device is based on the CA of CPU 112-1-P's impression that the D2H: RdShared Y message received at 6.7 from ECB 132 was sent by a CXL device but due to the conversion of the M2S message received by ECB 132 at 6.3 to the D2H: RdShared Y message, the request to read from Addr Y was actually made by another host (H) and not an CXL device (D).

Moving to 6.12 (H2D: GO-S+data)), the CA of CPU 112-1-P generates an H2D: GO-S+data message to provide the data provided by the core at CPU 112-1-P to ECB 132. In some examples, according to CXL 3.0 or subsequent CXL specifications, "GO-S" indicates that the data is to be a shared copy of the data that is shared with CPU 112-1-P.

Moving to 6.13 (SF updated for Addr X as P and S1), logic and/or features of ECB 132 such as snoop logic 135 updates its own, separately maintained SF table for Addr X to indicate the sharing of Addr X between the core at CPU 112-1-P and the core at CPU 122-1-S1.

Moving to 6.14 (S2M: data+CmpS), logic and/or features of ECB 132 such as CXL translation logic 133 generates an S2M: data+CmpS message and sends this message to the CA of CPU 122-1-S1. According to some examples, CXL translation logic 133 converts or translates the H2D: GO-S+data message received at 6.12 to the S2M: data+CmpS to maintain the impression that the core at CPU 122-1-S1 is an M—master, and that this message is being sent by an S—subordinate. For these examples, "CmpS" indicates that the reading of data is complete and that this read data is to be shared.

Moving to 6.15 (SF for Addr X updated to point to core S1), the CA of CPU 122-1-S1 updates its own, separately maintained SF table for Addr X to point to the core at CPU 122-1-S1 as having the shared data.

Moving to 6.16 (data), the CA of CPU 122-1-S1 provides the data to the core at CPU 122-1-S1. Flow 600 can then come to an end.

Figure 7:
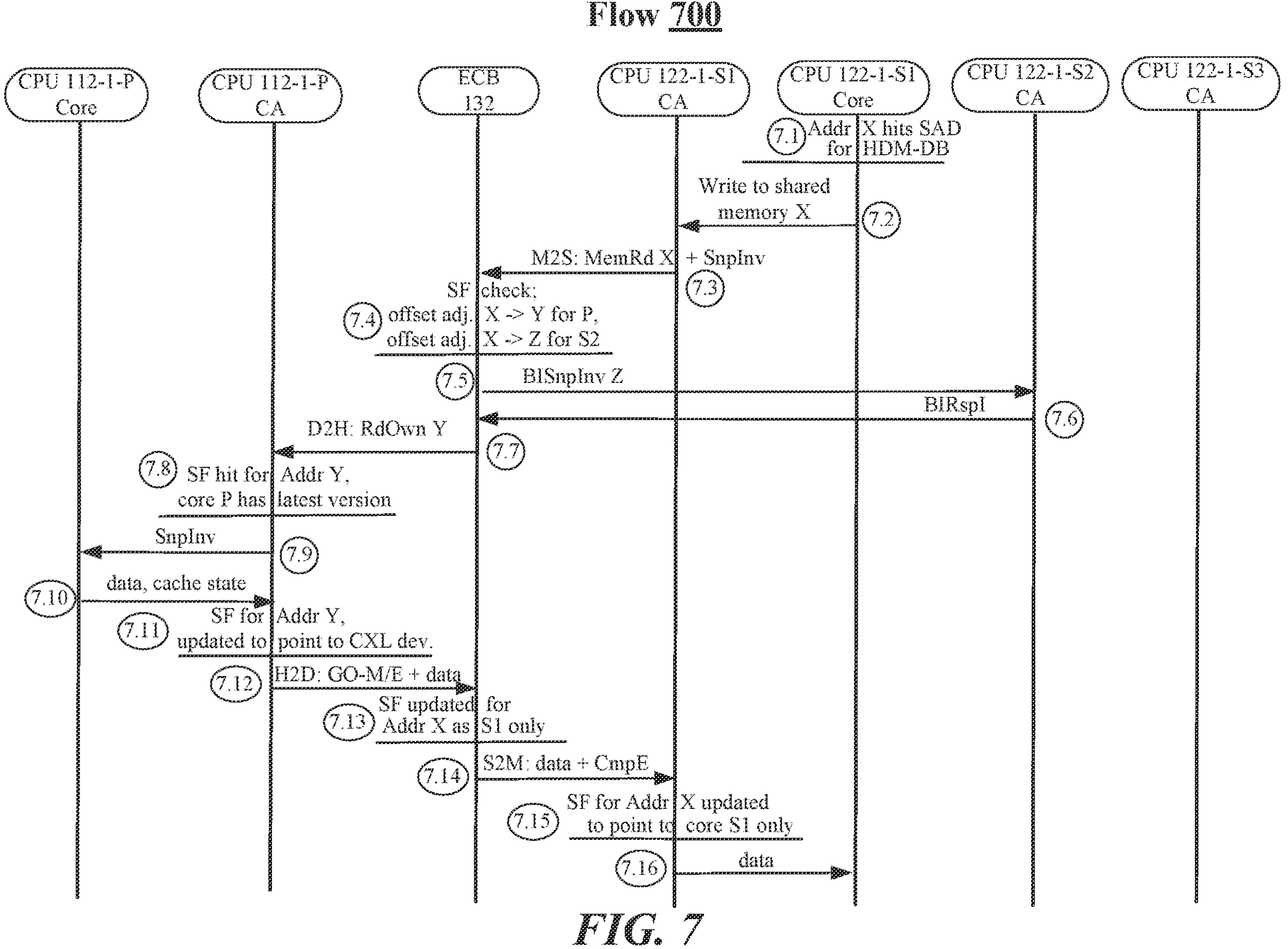
FIG. 7 illustrates an example second flow.

FIG. 7 illustrates an example flow 700. According to some examples, flow 700 shows an example of a core at CPU 122-1-S1 of secondary node 120-S1 writing to a shared memory region such as shared region 117 mapped to memory 114-P at primary node 110-P. For these examples, similar to flow 600, logic and/or features of ECB 132 translates or converts M2S/D2H, S2M/H2D requests/messages and H2D snoops generated by primary node 110-P or secondary nodes 120-S1, S2, S3 according to CXL 2.0, CXL 3.0 or subsequent CXL specification protocols. Flow 700 is not limited to the elements of system 100 shown in FIG. 7.

For example, logic and/or features of ECB 132 such as CXL translation logic 133, snoop logic 135, device cache 136 or data buffer 137 can facilitate one or more aspects of translation/conversions of M2S/D2H requests or H2D snoops. Also, CXL links 130-1 to 130-4 can be used to exchange requests/messages.

Beginning at 7.1 (Addr X hits SAD for HDM-DB), a core at CPU 122-1-S1 at secondary node 120-S1 is to write to a shared memory region of primary node 110-P's memory 114-P that has been mapped to system address memory map 127-S1 by a memory hole covered by a CXL.mem related HDM-DB SAD entry according to CXL 3.0 or subsequent CXL specifications. In some examples, address (Addr) X can represent the shared memory region to be written to by the core at CPU 122-1-S1.

Moving to 7.2 (Write to shared memory X), the core at CPU 122-1-S1 sends a write request to a CA of CPU 122-1-S1 to write to the shared memory with Addr X. According to some examples, the CA of CPU 122-1-S1 may receive requests to write to shared memory in order to maintain coherency of the shared memory that is shared with primary node 110-P and the other secondary nodes 120-S2 and 120-S3.

Moving to 7.3 (M2S: MemRd X+SnpInv), the CA of CPU 122-1-S1 generates an M2S memory read (MemRd) request to Addr X with a snoop invalidate (SnpInv). In some examples, according to CXL 3.0 or subsequent CXL specifications, SnpInv indicates a snoop request from secondary node 120-S1 for a cache line that is to be an exclusive copy of the cache line.

Moving to 7.4 (SF check; offset adj X→Y for P, offset adj X→Z for S2), logic and/or features of ECB 132 such as snoop logic 135 can check a SF table (e.g., snoop filter table 400) to determine which nodes may have the cache line associated with the mapped shared region corresponding to Addr X. According to some examples, snoop logic 135 arrives at a result that indicates an SF hit for Addr X at primary node 110-P that has an offset adjustment to Addr X to arrive at Addr Y and also an SF hit for Addr X at secondary node 120-S2 that has an offset adjustment to Addr X to arrive at Addr Z.

Moving to 7.5 (BISnpInv Z), logic and/or features of ECB 132 such as snoop logic 135 can cause a BISnpInv message for Addr Z to a CA of CPU 122-1-S2 at secondary node 120-S2 to indicate that the requester (in this case the core at CPU 122-1-S1) wants an exclusive copy of the cache line at Addr Z.

Moving to 7.6 (BIRSpI), responsive to the BISnpData message for Addr Z, the CA of CPU 122-1-S2, according to one example, returns a BIRspI to indicate that the current value or state of the cache line is "I" to indicate that a cacheable copy of the cache line is not present at Addr Z of secondary node 120-S2's shared map.

Moving to 7.7 (D2H: RdOwn Y), logic and/or features of ECB 132 such as CXL translation logic 133 generates a D2H RdOwn Y message and sends this message to a CA for CPU 112-1-P of primary node 110-P to request exclusive ownership of a cache line cached at Addr Y of shared region 117. In some examples, CXL translation logic 133 converts or translates the M2S: MemRd X+SnpInv request received at 7.3 to the D2H RdOwn Y message to make it appear to the CA for CPU 112-1-P that the request is being placed by a CXL device rather than being placed by a core of a host CPU, which is why the message sent at 7.3 by the CA of CPU 122-1-S1 was an M2S message.

Moving to 7.8 (SF hit for Addr Y, core P has latest version), responsive to the D2H: RdOwn Y message, the CA of CPU 112-1-P determines that its own, separately maintained SF table indicates the core at CPU 112-1-P has the latest version of the cache line at Addr Y.

Moving to 7.9 (SnpInv), the CA of CPU 112-1-P sends a SnpInv message to the core at CPU 112-1-P to indicate a request for exclusive use of date in the cache line and a state of the cache line.

Moving to 7.10 (data, cache state), the core at CPU 112-1-P returns the data and a state of the cache line to the CA of CPU 112-1-P. According to some examples, the cache state is indicated being in an exclusive or modified state to indicate that the core CPU 112-1-P has at most a shared copy of the cache line.

Moving to 7.11 (SF hit for Addr Y, updated to include CXL device), the CA of CPU 112-1-P updates its own, separately maintained SF table for Addr Y to include a CXL device. According to some examples, the CXL device is based on the CA of CPU 112-1-P's impression that the D2H: RdOwn Y message received at 7.7 from ECB 132 was sent by a CXL device but due to the conversion of the M2S message received by ECB 132 at 7.3 to the D2H: RdOwn Y message, the request to read from Addr Y was actually made by another host (H) and not a CXL device (D).

Moving to 7.12 (H2D: GO-M/E+data), the CA of CPU 112-1-P generates an H2D: GO-M/E+data message to provide the data provided by the core at CPU 112-1P to ECB 132. In some examples, according to CXL 3.0 or subsequent CXL specifications, "GO-M/E" indicates that the data in the cache line is in a modified or exclusive state.

Moving to 7.13 (SF updated for Addr X as S1 only), logic and/or features of ECB 132 such as snoop logic 135 updates its own, separately maintained SF table to indicate the core at CPU 122-1-S1 has exclusive ownership of the cache line at Addr X of shared memory.

Moving to 7.14 (S2M: data+CmpE), logic and/or features of ECB 132 such as CXL translation logic 133 generates an S2M: data+CmpE message and sends this message to the CA of CPU 122-1-S1. According to some examples, CXL translation logic 133 converts or translates the H2D: GO-M/E+data message received at 7.12 to the S2M: data+CmpE to maintain the impression that the core at CPU 122-1-S1 is an M—master, and that this message is being sent by an S—subordinate. For these examples, "CmpE" indicates that the core at CPU 122-1-S1 has exclusive ownership.

Moving to 7.15 (SF for Addr X updated to point to core S1 only), the CA of CPU 122-1-S1 updates its SF table for Addr X to point to the core at CPU 122-1-S1 as having the exclusive data.

Moving to 7.16 (data), the CA of CPU 122-1-S1 provides the data to the core at CPU 122-1-S1. Flow 700 can then come to an end.

Figure 8:
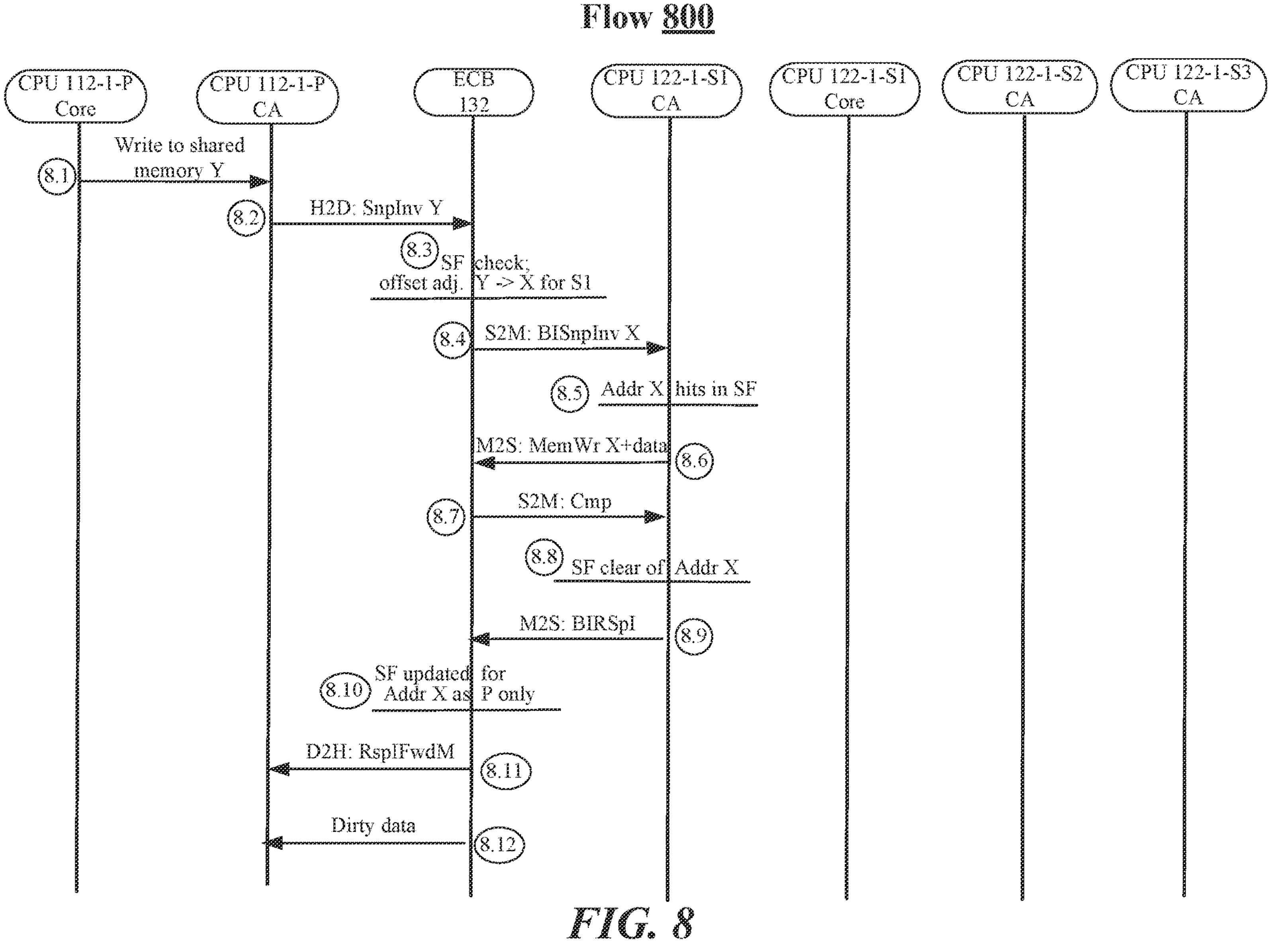
FIG. 8 illustrates an example third flow.

FIG. 8 illustrates an example flow 800. According to some examples, flow 800 shows an example of a core at CPU 112-1-P of primary node 110-P writing to a shared memory region such as shared region 117 mapped to memory 114-P at primary node 110-P after a core of a secondary node has performed a write to shared region 117. For these examples, similar to flows 600 and 700, logic and/or features of ECB 132 translates or converts M2S/D2H, S2M/H2D requests/messages and H2D snoops generated by primary node 110-P or secondary nodes 120-S1, S2, S3 according to CXL 2.0, CXL 3.0 and/or subsequent CXL specifications. Flow 800 is not limited to the elements of system 100 shown in FIG. 8. For example, logic and/or features of ECB 132 such as CXL translation logic 133, snoop logic 135, device cache 136 or data buffer 137 can facilitate one or more aspects of translation/conversions of M2S/D2H requests or H2D snoops. Also, CXL links 130-1 to 130-4 can be used to exchange requests/messages.

Beginning at 8.1 (Write to shared memory Y), a core at CPU 112-1-P at primary node 120-P writes to shared memory in shared region 117 of system address map 115-P that has Addr Y and sends an indication of this writing to Addr Y to the CA of CPU 112-1-P.

Moving to 8.2, (H2D: SnpInv Y), the CA of CPU 112-1-P generates an H2D: SnpInv Y message to indicate to other devices that the core at CPU 112-1-P intends ownership or exclusivity of the cache line at Addr Y of the shared memory in shared region 117.

Moving to 8.3, (SF check; offset adj. Y→X for S1), logic and/or features of ECB 132 such as snoop logic 135 can check a SF table (e.g., snoop filter table 400) to determine which nodes may have the cache line associated with the mapped shared region corresponding to Addr Y. According to some examples, snoop logic 135 arrives at a result that indicates an SF hit for Addr Y at primary node 110-P that has an offset adjustment to Addr Y to arrive at Addr X for secondary node 120-S1.

Moving to 8.4, (S2M: BISnpInv X), logic and/or features of ECB 132 such as CXL translation logic 133 generates a an S2M BISnpInv X message and sends this message to the CA for CPU 122-1-S1 to indicate to the CA of CPU 122-1-S1 of secondary node 120-S1 that the core at CPU 112-1-P intends ownership or exclusivity of the cache line at Addr X of the shared memory.

Moving to 8.5, (Addr X hits in SF), responsive to the S2M BISnpInv X message from ECB 132, the CA of CPU 122-1-S1 determines that its own, separately maintained SF table indicates the core at CPU 122-1-S1 has the latest version of the cache line at Addr X.

Moving to 8.6, (M2S: MemWr X+data), the CA of CPU 122-1-S1 generates a M2S MemWr X+data message to cause the data included in the latest version of the cache line at Addr X to be sent to ECB 132.

Moving to 8.7, (S2M: Cmp), logic and/or features at ECB 132 such as CXL translation logic 133 generates an S2M Cmp message to indicate that a writeback of the data is complete. In some examples, CXL translation logic 133 appears to the CA of CPU 122-1-S1 as a subordinate CXL device and that is why an S2M Cmp message is sent.

Moving to 8.8, (SF clear of Addr X), responsive to receipt of the S2M: Cmp message, the CA of CPU 122-1-S1 updates its own, separately maintained SF table to indicate that the cache line at Addr X includes a latest version of the cache line.

Moving to 8.9, (M2S: BIRSpI), the CA of CPU 122-1-S1 sends an M2S BIRSpI message to ECB 132 to indicate that a back-invalidation snoop has been completed and the cache state for the cache line at Addrx X is now in an invalid (I) state.

Moving to 8.10, (SF updated for Addr X as P only), logic and/or features of ECB 132 such as snoop logic 135 updates its own, separately maintained SF table to indicate the core at CPU 112-1-P has exclusive ownership of the cache line at Addr X Moving to 8.11, (D2H: RspIFwdM), logic and/or features of ECB 132 such as CXL translation logic 133 generates and sends a D2H RspIFwdM message to the CA of CPU 112-1-P to indicate that the cache line being snooped is now in an invalid/I state and can be assumed to not contain cached copies of this cache line. In some examples, CXL translation logic 133's generation of a D2H message flips the host to device relationship.

Moving to 8.12, (Dirty data), the data provided at 8.6 to ECB 132 is forwarded to the CA of CPU 112-1-P as dirty data. Flow 800 can then come to an end.

Figure 9:
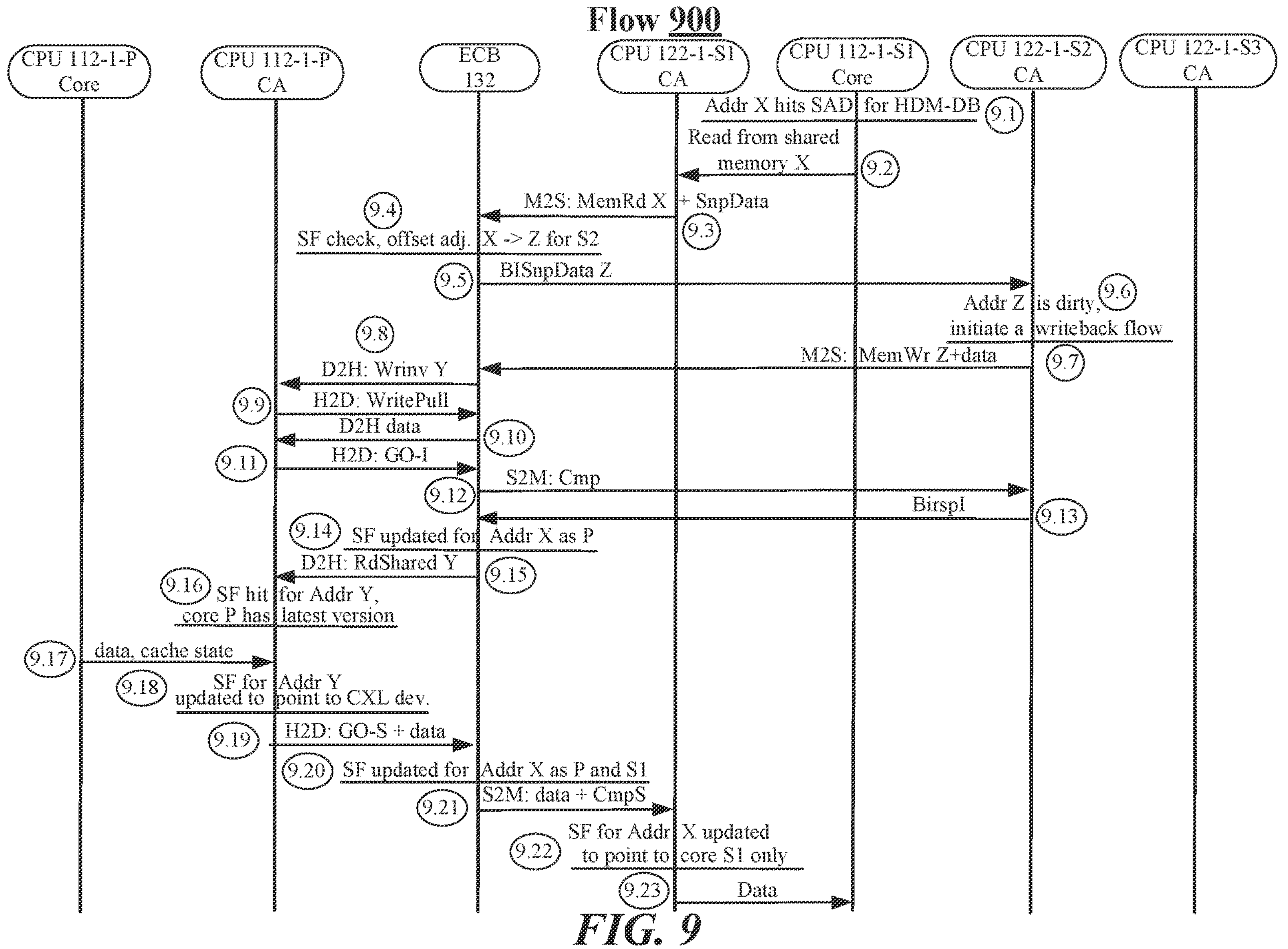
FIG. 9 illustrates an example fourth flow.

FIG. 9 illustrates an example flow 900. According to some examples, flow 900 shows an example of a writeback of a dirty cache line cached in a modified state in secondary node 120-S2 back to primary node 110-P. For these examples, similar to flows 600, 700 and 800, logic and/or features of ECB 132 translates or converts M2S/D2H, S2M/H2D requests/messages and H2D snoops generated by primary node 110-P or secondary nodes 120-S1, S2, S3 according to CXL 2.0, CXL 3.0 or subsequent CXL specification protocols. Flow 900 is not limited to the elements of system 100 shown in FIG. 9. For example, logic and/or features of ECB 132 such as CXL translation logic 133, snoop logic 135, device cache 136 or data buffer 137 can facilitate one or more aspects of translation/conversions of M2S/D2H requests or H2D snoops. Also, CXL links 130-1 to 130-4 can be used to exchange requests/messages.

Beginning at 9.1 (Addr X hits SAD for HDM-DB), a core at CPU 122-1-S1 of secondary node 120-S1 is to read a shared memory region of primary node 110-P's memory 114-P that has been mapped to system address memory map 127-S1 by a memory hole covered by a CXL.mem related HDM-DB SAD entry according to CXL 3.0 or subsequent CXL specifications. In some examples, Addr X can represent the shared memory region to be read by the core at CPU 122-1-S1.

Moving to 9.2 (Read from shared memory X), the core at CPU 122-1-S1 sends a read request to the CA of CPU 122-1-S1 to read from shared memory with Addr X. According to some examples, the CA of CPU 122-1-S1 may receive requests to read from shared memory in order to maintain coherency of the shared memory that is shared with primary node 110-P and the other secondary nodes 120-S2 and 120-S3.

Moving to 9.3 (M2S: MemRd X+SnpData), the CA of CPU 122-1-S1 generates an M2S MemRd to Addr X with SnpData request. In some examples, according to CXL 3.0 or subsequent CXL specifications, SnpData indicates a snoop request from secondary node 120-S1 for a cache line that is intended to be cached in either a shared or exclusive state at the requestor.

Moving to 9.4 (SF check, offset adj X→Z for S2), logic and/or features of ECB 132 such as snoop logic 135 can check an SF table (e.g., snoop filter table 400) to determine which nodes may have the cache line associated with the mapped shared region corresponding to Addr X. According to some examples, snoop logic 135 arrives at a result that indicates an SF hit for Addr X at secondary node 120-S2 that has an offset adjustment to Addr X to arrive at Addr Z.

Moving to 9.5 (BISnpData Z), logic and/or features of ECB 132 such as snoop logic 135 can cause a BISnpData message for Addr Z to be sent to the CA of CPU 122-1-S2 at secondary node 120-S2 to indicate that the requester (in this case the core at CPU 122-1-S1) needs an indication of the current value or state of the cache line at Addr Z.

Moving to 9.6 (Addr Z is dirty, initiate a writeback flow), the CA of CPU 122-1-S2 determines that the cache line at Addr Z is in a modified state and hence is dirty and this triggers an initiation of a writeback flow.

Moving to 9.7 (M2S: MemWr Z+data), the CA of CPU 122-1-S2 generates and sends an M2S MemWr Z+data message to indicate that secondary node 122-S2 wants to write a cache line back to Addr Z.

Moving to 9.8 (D2H: Wrinv Y), logic and/or features of ECB 132 such as snoop logic 135 determines via a check of its SF table an offset adjustment to Addr Z to arrive at Addr Y at primary node 110-P for CPU 112-1-P and CXL translation logic 133 generates and sends a D2H Wrinv Y message to the CA of CPU 112-1-P. The D2H Wrinv Y message, for example, can indicate a write invalidate cache line request.

Moving to 9.9 (H2D: WritePull), responsive to the D2H Wrinv Y message, the CA of CPU 112-1-P sends an H2D WritePull message to receive the data from the cache line that was previously sent to ECB 132 at 9.7 of flow 900.

Moving to 9.10 (D2H data), responsive to the H2D WritePull message, ECB sends the data from the cache line that was previously sent to ECB 132 at 9.7 of flow 900.

Moving to 9.11 (H2D: GO-I), the CA of CPU 112-1-P generates and sends an H2D GO-I message to ECB 132 to indicate completion of the write invalidate cache line request.

Moving to 9.12 (S2M: Cmp), logic and/or features of ECB 132 such as CXL translation logic 133 generates and sends an S2M Cmp message to the CA of CPU 122-1-S1 at secondary node 120-S2 to indicate completion of the M2S MemWr Z+data request received at 9.7 of flow 900.

Moving to 9.13 (BirSPI), responsive to the S2M Cmp message from ECB 132, the CA of CPU 122-1-S2, according to one example, returns a BIRspI to indicate that the current value or state of the cache line is "I" to indicate that a cacheable copy of the cache line is not present at Addr Z of secondary node 120-S2's shared map.

Moving to 9.14 (SF updated for Addr X as P), logic and/or features of ECB 132 such as snoop logic 135 updates its own, separately maintained SF table to indicate the core at CPU 112-1-P currently has exclusive ownership of the cache line associated with Addr X of shared memory.

Moving to 9.15 (D2H: RdShared Y), logic and/or features of ECB 132 such as CXL translation logic 133 generates a D2H RdShared Y message and sends this message to a CA for CPU 112-1-P of primary node 110-P to request a cache line cached at Addr Y of shared region 117.

Moving to 9.16 (SF hit for Addr Y, core P has latest version), responsive to the D2H: RdShared Y message, the CA of CPU 112-1-P determines that its own, separately maintained SF table indicates the core at CPU 112-1-P has the latest version of the cache line at Addr Y.

Moving to 9.17 (data, cache state), the core at CPU 112-1-P returns the data and a state of the cache line to the CA of CPU 112-1-P. According to some examples, the cache state is indicated as shared to indicate that the core at CPU 112-1-P has at most a shared copy of the cache line.

Moving to 9.18 (SF for Addr Y updated to include CXL device), the CA of CPU 112-1-P updates its own, separately maintained SF table for Addr Y to include a CXL device. According to some examples, the CXL device is based on the CA of CPU 112-1-P's impression that the D2H: RdShared Y message received at 9.15 from ECB 132 was sent by a CXL device.

Moving to 9.19 (H2D: GO-S+data), the CA of CPU 112-1-P generates an H2D: GO-S+data message to provide the data provided by the core at CPU 112-1P to ECB 132. In some examples, according to CXL 3.0 or subsequent CXL specifications, "GO-S" can indicate that the data is to be a shared copy of the data that is shared with CPU 112-1-P.

Moving to 9.20 (SF updated for Addr X as P and S1), logic and/or features of ECB 132 such as snoop logic 135 updates its own, separately maintained SF table for Addr X to indicate the sharing of Addr X between the core at CPU 112-1-P and the core at CPU 122-1-S1.

Moving to 9.21 (S2M: data+CmpS), logic and/or features of ECB 132 such as CXL translation logic 133 generates an S2M: data+CmpS message and sends this message to the CA of CPU 122-1-S1. According to some examples, CXL translation logic 133 converts or translates the H2D: GO-S+ data message received at 6.12 to the S2M: data+CmpS to maintain the impression that the core at CPU 122-1-S1 is an M—master, and that this message is being sent by an S—subordinate. For these examples, "CmpS" indicates that the reading of data is complete and that this read data is to be shared.

Moving to 9.22 (SF for Addr X updated to point to core S1), the CA of CPU 122-1-S1 updates its own, separately maintained SF table for Addr X to point to the core at CPU 122-1-S1 as having the shared data.

Moving to 9.23 (data), the CA of CPU 122-1-S1 provides the data to the core at CPU 122-1-S1. Flow 900 can then come to an end.

For flows 600 to 900 described above for FIGS. 6-9 it is assumed that ECB 132 can guarantee snoop GO ordering requirements per CXL 3.0 or subsequent CXL specifications between primary node 110-P and ECB 132 for H2D snoop request messages and H2D GO response messages. It also assumed that ECB 132 can guarantee the snoop GO ordering requirements as per CXL 3.0 or subsequent CXL specifications between secondary nodes 120-S1, S2, S3 and ECB 132. It is also assumed that ECB 132 can rely on BIConflict flows per CXL 3.0 or subsequent CXL specifications to resolve conflicts.

Flows 600 to 900 described above for FIGS. 6-9 each show various examples of back-invalidate snooping as described in, for example CXL 3.0, to maintain coherency for shared memory. CXL 2.0 does not describe use of back-invalidate snooping. However, for CXL.mem based HDM-D mapped shared memory, non-cacheable flows using CXL 2.0 CXL.cache protocols (e.g., RdCurr/WCiL) can be used to avoid deadlock conditions. For example, secondary nodes are disallowed from caching an HDM-D shared memory region in their local caches. Since CXL 2.0 does not describe back-invalidate snooping, D2H requests using CXL.cache protocols can be used instead for a targeted HDM-D range. A potential drawback from this approach is that bias-flip flows supported by CXL 2.0 do not guarantee a deadlock-free operation.

Figure 10:
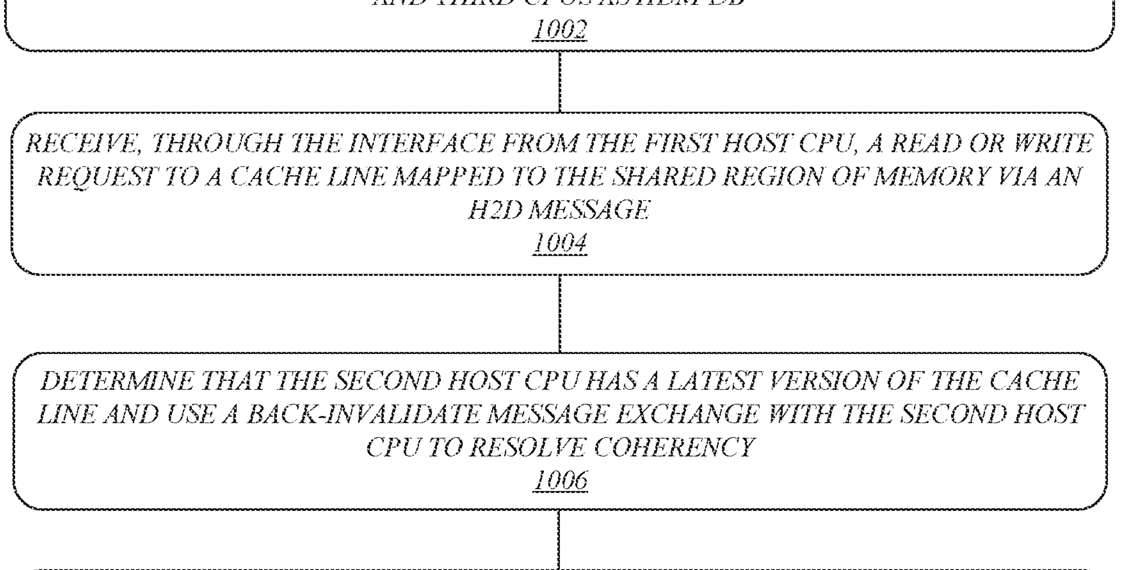
FIG. 10 illustrates an example first logic flow.

FIG. 10 illustrates an example logic flow 1000. In some examples, logic flow 1000 can be implemented by logic and/or features of an extended CXL bridge ECB such as ECB 132. For these examples, the logic and/or features can include, but is not limited to, an interface such as interface 138 and circuitry included in a CXL switch such as circuitry 131 or separate circuitry included in a dielet or chiplet version of an ECB such as included in ECB 218-P, ECB s 228-S1, S2, S3 or ECB 332. Although not specifically mentioned above or below, this disclosure contemplates that other elements of systems similar to systems 100, 200 or 300 shown in FIGS. 1-3 can implement or be associated with at least portions of logic flow 1000.

According to some examples, as shown in FIG. 10, logic flow 1000 at block 1002 can couple, through an interface, with a plurality of communication links that are arranged to separately couple with a first host CPU at a first node, a second host CPU at a second node and a third host CPU at a third node, wherein the first host CPU is to be arranged to share a region of memory maintained at the first node with the second host CPU and the third host CPU, the shared region of memory to be mapped by the second and third CPUs as HDM-DB. For these examples, the first node can be a primary node such as 110-P and the second and third nodes can be secondary nodes such as 120-S1, 120-S2 or 120-S3. The interface, for example, can be interface 138. The region of shared memory, for example, can be shared region 117. Also, the shared region of memory mapped as HDM-DB can be a shared map 127-S1, 127-S2 or 127-S3 that can be mapped using CXL.mem based HDM-DB according to CXL 3.0 or subsequent CXL specifications.

In some examples, logic flow 1000 at block 1004 can receive, through the interface from the first host CPU, a read or write request to a cache line mapped to the shared region of memory via a H2D message. The H2D message, for example, may be generated based on CXL 3.0 or subsequent CXL specification protocols.

According to some examples, logic flow 1000 at block 1006 can determine that the second host CPU has a latest version of the cache line and use a back-invalidate message exchange with the second host CPU to resolve coherency. For these examples, the back-invalidate message exchange can use messages described in CXL 3.0 or subsequent CXL specifications to resolve coherency. For example, as described for flows 600 and 700 shown in FIGS. 6-7.

According to some examples, logic flow 1000 at block 1008 can send, through the interface to the first host CPU, a D2H message to include the latest version of the cache line and an indication that the second host CPU does not have a cached copy of the cache line. The D2H message, for example, may be generated based on CXL 3.0 or subsequent CXL specification protocols.

Figure 11:
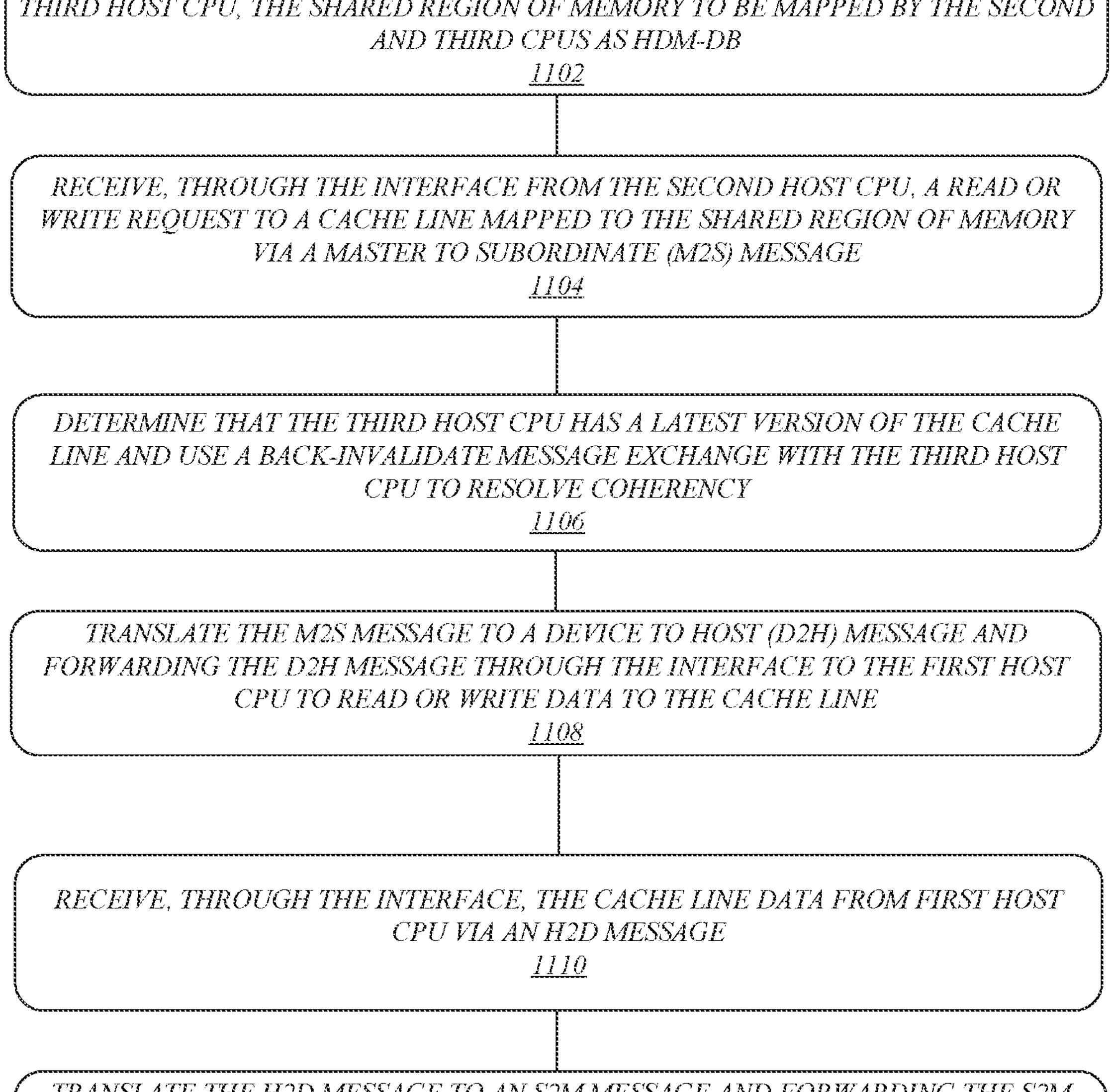
FIG. 11 illustrates an example second logic flow.

FIG. 11 illustrates an example logic flow 1100. In some examples, logic flow 1100 can be implemented by logic and/or features of an extended CXL bridge ECB such as ECB 132. For these examples, the logic and/or features can include, but is not limited to, an interface such as interface 138 and circuitry included in a CXL switch such as circuitry 131 or separate circuitry included in a dielet or chiplet version of an ECB such as included in ECB 218-P, ECB s 228-S1, S2, S3 or ECB 332. Although not specifically mentioned above or below, this disclosure contemplates that other elements of systems similar to systems 100, 200 or 300 shown in FIGS. 1-3 can implement or be associated with at least portions of logic flow 1100.

According to some examples, as shown in FIG. 11, logic flow 1100 at block 1102 can couple, through an interface, with a plurality of communication links that are arranged to separately couple with a first host CPU at a first node, a second host CPU at a second node and a third host CPU at a third node, wherein the first host CPU is to be arranged to share a region of memory maintained at the first node with the second host CPU and the third host CPU, the shared region of memory to be mapped by the second and third CPUs as HDM-DB. For these examples, the first node can be a primary node such as 110-P and the second and third nodes can be secondary nodes such as 120-S1, 120-S2 or 120-S3. The interface, for example, can be interface 138. The region of shared memory, for example, can be shared region 117. Also, the shared region of memory mapped as HDM-DB can be shared map 127-S1, 127-S2 or 127-S3 that can be mapped using CXL.mem based HDM-DB.

In some examples, logic flow 1100 at block 1104 can receive, through the interface from the second host CPU, a read or write request to a cache line mapped to the shared region of memory via an M2S message. The M2S message, for example, may be generated based on CXL 3.0 or subsequent CXL specification protocols.

According to some examples, logic flow 1100 at block 1106 can determine that the third host CPU has a latest version of the cache line and use a back-invalidate message exchange with the third host CPU to resolve coherency. For these examples, the back-invalidate message exchange can use messages described in CXL 3.0 or subsequent CXL specifications to resolve coherency. For example, as described for flow 900 shown in FIG. 9.

According to some examples, logic flow 1100 at block 1108 can translate the M2S message to a D2H message and forward the D2H message through the interface to the first host CPU to read or write data to the cache line. The D2H message, for example, may be generated based on CXL 3.0 or subsequent CXL specification protocols.

In some examples, logic flow 1100 at block 1110 can receive, through the interface, the cache line data from first host CPU via a H2D message. The H2D message, for example, may be generated based on CXL 3.0 or subsequent CXL specification protocols.

According to some examples, logic flow 1100 at block 1112 can translate the H2D message to an S2M message and forward the S2M message through the interface to provide the cache line data that was written to or read from the cache line to the second host CPU. The S2M message, for example, may be generated based on CXL 3.0 or subsequent CXL specification protocols.

The set of logic flows shown in FIGS. 10 and 11 may be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 12 illustrates an example logic flow 1200. In some examples, logic flow 1200 can be implemented by logic and/or features of an extended CXL bridge ECB such as ECB 132. For these examples, the logic and/or features can include, but is not limited to, an interface such as interface 138 and circuitry included in a CXL switch such as circuitry 131 or separate circuitry included in a dielet or chiplet version of an ECB such as included in ECB 218-P, ECB s 228-S1, S2, S3 or ECB 332. Although not specifically mentioned above or below, this disclosure contemplates that other elements of systems similar to systems 100, 200 or 300 shown in FIGS. 1-3 can implement or be associated with at least portions of logic flow 1200.

According to some examples, as shown in FIG. 12, logic flow 1200 at block 1202 can couple, through an interface, with a plurality of communication links that are arranged to separately couple with a first host CPU at a first node and a second host CPU at a second node, wherein the first host CPU is to be arranged to share a region of memory maintained at the first node with the second host CPU, the shared region of memory to be mapped by the second CPU as HDM-D. For these examples, the first node can be a primary node such as 110-P and the second node can be a secondary node such as secondary node 120-S1, 120-S2 or 120-S3. The interface, for example, can be interface 138. The region of shared memory, for example, can be shared region 117. Also, the shared region of memory mapped as HDM-D can be a shared map 127-S1, 127-S2 or 127-S3 that can be mapped using CXL.mem based HDM-D according to CXL 2.0, CXL 3.0 or subsequent CXL specifications.

In some examples, logic flow 1200 at block 1204 can receive, through the interface from the first host CPU, a read or write request to a cache line mapped to the shared region of memory via an H2D message. The H2D message, for example, may be generated based on CXL 2.0, CXL 3.0 or subsequent CXL specification protocols.

According to some examples, logic flow 1200 at block 1206 can determine that the second host CPU has a latest version of the cache line. For these examples, a determination that the second host CPU has a latest version of the cache line can be based on an ECB translating the H2D message received from the first host CPU to a second D2H message that indicates an address for the cache line in the shared region of memory for which the first host CPU has requested to read or write, sending the second D2H message to the second host CPU through the interface and then receive, through the interface from the second host CPU, a response to indicate that the second host CPU does not have a cached copy of the cache line via a second H2D message.

According to some examples, logic flow 1200 at block 1208 can send, through the interface to the first host CPU, a D2H message to include the latest version of the cache line and an indication that the second host CPU does not have a cached copy of the cache line. The D2H message, for example, may be generated based on CXL 2.0, CXL 3.0 or subsequent CXL specification protocols.

Figure 13:
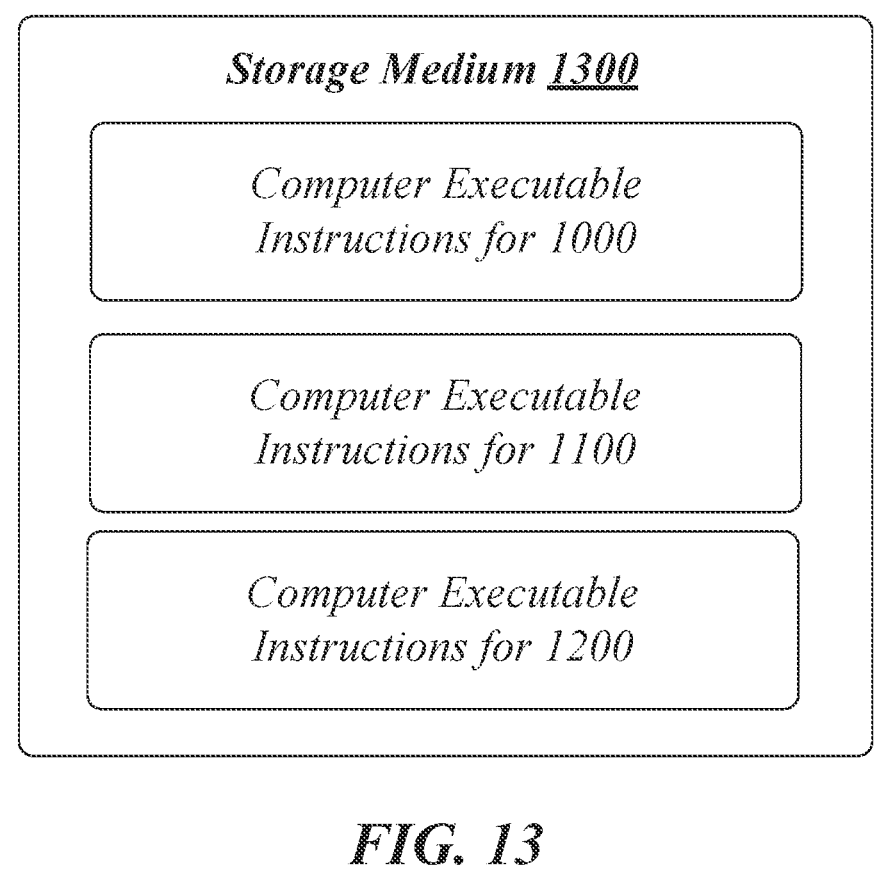

FIG. 13 illustrates an example of a storage medium. As shown in FIG. 13, the storage medium includes a storage medium 1300. The storage medium 1300 may comprise an article of manufacture. In some examples, storage medium 1300 may include any non-transitory computer readable medium or machine readable medium, such as an optical, magnetic or semiconductor storage. Storage medium 1200 may store various types of computer executable instructions, such as instructions to implement logic flow 1000, logic flow 1100 or logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Although not depicted, any system can include and use a power supply such as but not limited to a battery, AC-DC converter at least to receive alternating current and supply direct current, renewable energy source (e.g., solar power or motion based power), or the like.

One or more aspects of at least one example may be implemented by representative instructions stored on at least one machine-readable medium which represents various logic within a processor, processor circuit, ASIC, or FPGA which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the processor, processor circuit, ASIC, or FPGA.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example apparatus can include an interface and circuitry. The interface can be arranged to couple with a plurality of communication links that are arranged to separately couple with a first host CPU at a first node, a second host CPU at a second node and a third host CPU at a third node. For this example, the first host CPU can be arranged to share a region of memory maintained at the first node with the second host CPU and the third host CPU. The shared region of memory can be mapped by the second and third CPUs as HDM-DB. The circuitry can be configured to receive, through the interface from the first host CPU, a read or write request to a cache line mapped to the shared region of memory via an H2D message. The circuitry can also be configured to determine that the second host CPU has a latest version of the cache line and use a back-invalidate message exchange with the second host CPU to resolve coherency. The circuitry can also be configured to send, through the interface to the first host CPU, a D2H message to include the latest version of the cache line and an indication that the second host CPU does not have a cached copy of the cache line.

Example 2. The apparatus of example 1, the circuitry configured to use the back-invalidate message exchange can include the circuitry to send, through the interface, S2M messages to the second host CPU and receive, through the interface, M2A messages from the second host CPU to resolve coherency.

Example 3. The apparatus of example 1, the interface and the circuitry can be included in an ECB and the plurality of communication links are arranged to operate using CXL specification protocols.

Example 4. The apparatus of example 3, the ECB can be located at a CXL switch and is arranged to be implemented by CXL switch circuitry.

Example 5. The apparatus of example 3, the ECB can be included in a die located at a CXL switch.

Example 6. The apparatus of example 3, the shared region of memory mapped by the second and third CPUs as HDM-DB can include the shared region of memory to be CXL.mem based HDM-DB mapped shared memory.

Example 7. An example method can include coupling, through an interface, with a plurality of communication links that are arranged to separately couple with a first host CPU at a first node, a second host CPU at a second node and a third host CPU at a third node. For this example, the first host CPU can be arranged to share a region of memory maintained at the first node with the second host CPU and the third host CPU. The shared region of memory can be mapped by the second and third CPUs as HDM-DB. The method can also include receiving, through the interface from the first host CPU, a read or write request to a cache line mapped to the shared region of memory via an H2D message. The method can also include determining that the second host CPU has a latest version of the cache line and use a back-invalidate message exchange with the second host CPU to resolve coherency. The method can also include sending, through the interface to the first host CPU, a D2H message to include the latest version of the cache line and an indication that the second host CPU does not have a cached copy of the cache line.

Example 8. The method of example 7, to use the back-invalidate message exchange can include sending, through the interface, S2M messages to the second host CPU and receiving, through the interface, M2A messages from the second host CPU to resolve coherency.

Example 9. The method of example 7, the interface can be arranged to operate using CXL specification protocols.

Example 10. The method of example 9, the shared region of memory to be mapped by the second and third CPUs as HDM-DB can include the shared region of memory to be CXL.mem based HDM-DB mapped shared memory.

Example 11. An example at least one machine readable medium can include a plurality of instructions that in response to being executed by a system can cause the system to carry out a method according to any one of examples 7 to 10.

Example 12. An example apparatus can include means for performing the methods of any one of examples 7 to 10.

Example 13. An example at least one non-transitory computer-readable storage medium, can include a plurality of instructions, that when executed, can cause circuitry to couple, through an interface, with a plurality of communication links that are arranged to separately couple with a first host CPU at a first node, a second host CPU at a second node and a third host CPU at a third node. For this example, the first host CPU can be arranged to share a region of memory maintained at the first node with the second host CPU and the third host CPU. The shared region of memory can be mapped by the second and third CPUs as HDM-DB. The instructions can also cause the circuitry to receive, through the interface from the first host CPU, a read or write request to a cache line mapped to the shared region of memory via an H2D message. The instructions can also cause the circuitry to determine that the second host CPU has a latest version of the cache line and use a back-invalidate message exchange with the second host CPU to resolve coherency. The instructions can also cause the circuitry to send, through the interface to the first host CPU, a D2H message to include the latest version of the cache line and an indication that the second host CPU does not have a cached copy of the cache line.

Example 14. The at least one non-transitory computer-readable storage medium of example 13, to use the back-invalidate message exchange can include to send, through the interface, S2M messages to the second host CPU and receive, through the interface, M2A messages from the second host CPU to resolve coherency.

Example 15. The at least one non-transitory computer-readable storage medium of example 13, the interface can be arranged to operate using CXL specification protocols.

Example 16. The at least one non-transitory computer-readable storage medium of example 15, the shared region of memory to be mapped by the second and third CPUs as HDM-DB can include the shared region of memory to be CXL.mem based HDM-DB mapped shared memory.

Example 17. An example apparatus can include an interface arranged to couple with a plurality of communication links that are arranged to separately couple with a first host CPU at a first node, a second host CPU at a second node and a third host CPU at a third node. For this example the first host CPU can be arranged to share a region of memory maintained at the first node with the second host CPU and the third host CPU. The shared region of memory can be mapped by the second and third CPUs as HDM-DB. The apparatus can also include circuitry configured to receive, from the second host CPU, a read or write request to a cache line mapped to the shared region of memory via a M2A message. The circuitry can also be configured to determine that the third host CPU has a latest version of the cache line and use a back-invalidate message exchange with the third host CPU to resolve coherency. The circuitry can also be configured to translate the M2S message to a D2H message and forward the D2H message to the first host CPU to read or write data to the cache line. The circuitry can also be configured to receive the cache line data from the first host CPU via an H2D message. The circuitry can also be configured to translate the H2D message to a S2M message and forward the S2M message to provide the cache line data that was written to or read from the cache line to the second host CPU.

Example 18. The apparatus of example 17, the interface and the circuitry can be included in an ECB and the plurality of communication links can be arranged to operate using CXL specification protocols.

Example 19. The apparatus of example 18, the ECB can be located at a CXL switch and can be arranged to be implemented by CXL switch circuitry.

Example 20. The apparatus of example 18, the ECB can be included in a die located at a CXL switch.

Example 21. The apparatus of example 18, the shared region of memory to be mapped by the second and third CPUs as HDM-DB can include the shared region of memory to be CXL.mem based HDM-DB mapped shared memory.

Example 22. An example method can include coupling, through an interface, with a plurality of communication links that are arranged to separately couple with a first host CPU at a first node, a second host CPU at a second node and a third host CPU at a third node. For this example, the first host CPU can be arranged to share a region of memory maintained at the first node with the second host CPU and the third host CPU. The shared region of memory can be mapped by the second and third CPUs as HDM-DB. The method can also include receiving, through the interface from the second host CPU, a read or write request to a cache line mapped to the shared region of memory via a M2A message. The method can also include determining that the third host CPU has a latest version of the cache line and use a back-invalidate message exchange with the third host CPU to resolve coherency. The method can also include translating the M2S message to a D2H message and forwarding the D2H message through the interface to the first host CPU to read or write data to the cache line. The method can also include receiving, through the interface, the cache line data from the first host CPU via an H2D message. The method can also include translating the H2D message to a S2M message and forwarding the S2M message through the interface to provide the cache line data that was written to or read from the cache line to the second host CPU.

Example 23. The method of example 22, the interface can be arranged to operate using CXL specification protocols.

Example 24. The method of example 23, the shared region of memory to be mapped by the second and third CPUs as HDM-DB can include the shared region of memory to be CXL.mem based HDM-DB mapped shared memory.

Example 25. An example at least one machine readable medium can include a plurality of instructions that in response to being executed by a system can cause the system to carry out a method according to any one of examples 22 to 24.

Example 26. An example apparatus can include means for performing the methods of any one of examples 22 to 24.

Example 27. An example at least one non-transitory computer-readable storage medium, can include a plurality of instructions, that when executed, can cause circuitry to couple, through an interface, with a plurality of communication links that are arranged to separately couple with a first host CPU at a first node, a second host CPU at a second node and a third host CPU at a third node. For this example, the first host CPU can be arranged to share a region of memory maintained at the first node with the second host CPU and the third host CPU, the shared region of memory to be mapped by the second and third CPUs as HDM-DB. The instructions can also cause the circuitry to receive, through the interface from the second host CPU, a read or write request to a cache line mapped to the shared region of memory via a M2A message. The instructions can also cause the circuitry to determine that the third host CPU has a latest version of the cache line and use a back-invalidate message exchange with the third host CPU to resolve coherency. The instructions can also cause the circuitry to translate the M2S message to a D2H message and forward the D2H message through the interface to the first host CPU to read or write data to the cache line. The instructions can also cause the circuitry to receive, through the interface, the cache line data from the first host CPU via an H2D message. The instructions can also cause the circuitry to translate the H2D message to a S2M message and forward the S2M message through the interface to provide the cache line data that was written to or read from the cache line to the second host CPU.

Example 28. The at least one non-transitory computer-readable storage medium of example 27, the interface can be arranged to operate using CXL specification protocols.

Example 29. The at least one non-transitory computer-readable storage medium of example 28, the shared region of memory to be mapped by the second and third CPUs as HDM-DB can include the shared region of memory to be CXL.mem based HDM-DB mapped shared memory.

Example 30. An example apparatus can include an interface arranged to couple with a plurality of communication links that are arranged to separately couple with a first host CPU at a first node and a second host CPU at a second node. For this example, the first host CPU can be arranged to share a region of memory maintained at the first node with the second host CPU. The shared region of memory can be mapped by the second CPU as HDM-D. The apparatus can also include circuitry configured to receive, through the interface from the first host CPU, a read or write request to a cache line mapped to the shared region of memory via an H2D message. The circuitry can also be configured to determine that the second host CPU has a latest version of the cache line. The circuitry can also be configured to send, through the interface to the first host CPU, a D2H message to include the latest version of the cache line and an indication that the second host CPU does not have a cached copy of the cache line.

Example 31. The apparatus of example 30, to determine that the second host CPU has the latest version of the cache line can include the circuitry configured to translate the H2D message received from the first host CPU to a second D2H message, the second D2H message to indicate an address for the cache line in the shared region of memory for which the first host CPU has requested to read or write. The circuitry can also be configured to send, through the interface, the second D2H message to the second host CPU. The circuitry can also be configured to receive, through the interface from the second host CPU, a response to indicate that the second host CPU does not have a cached copy of the cache line via a second H2D message.

Example 32. The apparatus of example 30, the interface and the circuitry can be included in an ECB and the plurality of communication links can be arranged to operate using CXL specification protocols.

Example 33. The apparatus of example 32, the ECB can be located at a CXL switch and can be arranged to be implemented by CXL switch circuitry.

Example 34. The apparatus of example 32, the ECB can be included in a die located at a CXL switch.

Example 35. The apparatus of example 32, the shared region of memory to be mapped by the second CPU as HDM-D can be the shared region of memory to be CXL.mem based HDM-D mapped shared memory.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:

an interface arranged to couple with a plurality of communication links that are arranged to separately couple with a first host central processing unit (CPU) at a first node, a second host CPU at a second node and a third host CPU at a third node, wherein the first host CPU is to be arranged to share a region of memory maintained at the first node with the second host CPU and the third host CPU, the shared region of memory to be mapped by the second and third CPUs as host-managed device memory (HDM) device coherent using back-invalidation (HDM-DB); and circuitry configured to:

receive, through the interface from the first host CPU, a read or write request to a cache line mapped to the shared region of memory via a host to device (H2D) message;

determine that the second host CPU has a latest version of the cache line and use a back-invalidate message exchange with the second host CPU to resolve coherency; and send, through the interface to the first host CPU, a device to host (D2H) message to include the latest version of the cache line and an indication that the second host CPU does not have a cached copy of the cache line.

2. The apparatus of claim 1, wherein the circuitry configured to use the back-invalidate message exchange comprises the circuitry to send, through the interface, subordinate to master (S2M) messages to the second host CPU and receive, through the interface, master to subordinate (M2S) messages from the second host CPU to resolve coherency.

3. The apparatus of claim 1, wherein the interface and the circuitry are included in an extended Compute Express Link (CXL) bridge (ECB) and the plurality of communication links are arranged to operate using CXL specification protocols.

4. The apparatus of claim 3, wherein the ECB is located at a CXL switch and is arranged to be implemented by CXL switch circuitry.

5. The apparatus of claim 3, wherein the ECB is included in a die located at a CXL switch.

6. The apparatus of claim 3, wherein the shared region of memory to be mapped by the second and third CPUs as HDM-DB comprises the shared region of memory to be CXL.mem based HDM-DB mapped shared memory.

7. At least one non-transitory computer-readable storage medium, comprising a plurality of instructions, that when executed, cause circuitry to:

couple, through an interface, with a plurality of communication links that are arranged to separately couple with a first host central processing unit (CPU) at a first node, a second host CPU at a second node and a third host CPU at a third node, wherein the first host CPU is to be arranged to share a region of memory maintained at the first node with the second host CPU and the third host CPU, the shared region of memory to be mapped by the second and third CPUs as host-managed device memory (HDM) device coherent using back-invalidation (HDM-DB);

receive, through the interface from the first host CPU, a read or write request to a cache line mapped to the shared region of memory via a host to device (H2D) message;

determine that the second host CPU has a latest version of the cache line and use a back-invalidate message exchange with the second host CPU to resolve coherency; and send, through the interface to the first host CPU, a device to host (D2H) message to include the latest version of the cache line and an indication that the second host CPU does not have a cached copy of the cache line.

8. The at least one non-transitory computer-readable storage medium of claim 7, wherein to use the back-invalidate message exchange comprises to send, through the interface, subordinate to master (S2M) messages to the second host CPU and receive, through the interface, master to subordinate (M2S) messages from the second host CPU to resolve coherency.

9. The at least one non-transitory computer-readable storage medium of claim 7, wherein the interface is arranged to operate using Compute Express Link (CXL) specification protocols.

10. The at least one non-transitory computer-readable storage medium of claim 9, wherein the shared region of memory to be mapped by the second and third CPUs as HDM-DB comprises the shared region of memory to be CXL.mem based HDM-DB mapped shared memory.

11. An apparatus comprising:

an interface arranged to couple with a plurality of communication links that are arranged to separately couple with a first host central processing unit (CPU) at a first node, a second host CPU at a second node and a third host CPU at a third node, wherein the first host CPU is to be arranged to share a region of memory maintained at the first node with the second host CPU and the third host CPU, the shared region of memory to be mapped by the second and third CPUs as host-managed device memory (HDM) device coherent using back-invalidation (HDM-DB); and circuitry configured to:

receive, from the second host CPU, a read or write request to a cache line mapped to the shared region of memory via a master to subordinate (M2S) message;

determine that the third host CPU has a latest version of the cache line and use a back-invalidate message exchange with the third host CPU to resolve coherency;

translate the M2S message to a device to host (D2H) message and forward the D2H message to the first host CPU to read or write data to the cache line;

receive the cache line data from first host CPU via a host to device (H2D) message; and translate the H2D message to a subordinate to master (S2M) message and forward the S2M message to provide the cache line data that was written to or read from the cache line to the second host CPU.

12. The apparatus of claim 11, wherein the interface and the circuitry are included in an extended Compute Express Link (CXL) bridge (ECB) and the plurality of communication links are arranged to operate using CXL specification protocols.

13. The apparatus of claim 12, wherein the ECB is located at a CXL switch and is arranged to be implemented by CXL switch circuitry.

14. The apparatus of claim 12, wherein the ECB is included in a die located at a CXL switch.

15. The apparatus of claim 12, wherein the shared region of memory to be mapped by the second and third CPUs as HDM-DB comprises the shared region of memory to be CXL.mem based HDM-DB mapped shared memory.

16. An apparatus comprising:

an interface arranged to couple with a plurality of communication links that are arranged to separately couple with a first host central processing unit (CPU) at a first node and a second host CPU at a second node, wherein the first host CPU is to be arranged to share a region of memory maintained at the first node with the second host CPU, the shared region of memory to be mapped by the second CPU as host-managed device memory (HDM) device coherent (HDM-D); and circuitry configured to:

receive, through the interface from the first host CPU, a read or write request to a cache line mapped to the shared region of memory via a host to device (H2D) message;

determine that the second host CPU has a latest version of the cache line; and send, through the interface to the first host CPU, a device to host (D2H) message to include the latest version of the cache line and an indication that the second host CPU does not have a cached copy of the cache line.

17. The apparatus of claim 16, wherein to determine that the second host CPU has the latest version of the cache line includes the circuitry configured to:

translate the H2D message received from the first host CPU to a second D2H message, the second D2H message to indicate an address for the cache line in the shared region of memory for which the first host CPU has requested to read or write;

send, through the interface, the second D2H message to the second host CPU; and receive, through the interface from the second host CPU, a response to indicate that the second host CPU does not have a cached copy of the cache line via a second H2D message.

18. The apparatus of claim 16, wherein the interface and the circuitry are included in an extended Compute Express Link (CXL) bridge (ECB) and the plurality of communication links are arranged to operate using CXL specification protocols.

19. The apparatus of claim 18, wherein the ECB is located at a CXL switch and is arranged to be implemented by CXL switch circuitry.

20. The apparatus of claim 18, wherein the ECB is included in a die located at a CXL switch.

21. The apparatus of claim 18, wherein the shared region of memory to be mapped by the second CPU as HDM-D comprises the shared region of memory to be CXL.mem based HDM-D mapped shared memory.

* * * * *